(12) United States Patent
Neuhaus et al.

(10) Patent No.: US 7,146,689 B2
(45) Date of Patent: *Dec. 12, 2006

(54) EXPANSION RING ASSEMBLY

(75) Inventors: Ronald W Neuhaus, Fort Wayne, IN (US); James W Skinner, Fort Wayne, IN (US)

(73) Assignee: Press-Seal Gasket Corporation, Fort Wayne, IN (US)

( * ) Notice: Subject to any disclaimer, the term of this patent is extended or adjusted under 35 U.S.C. 154(b) by 169 days.

This patent is subject to a terminal disclaimer.

(21) Appl. No.: 10/885,285

(22) Filed: Jul. 6, 2004

(65) Prior Publication Data

US 2005/0006853 A1    Jan. 13, 2005

Related U.S. Application Data

(63) Continuation-in-part of application No. 10/280,917, filed on Oct. 25, 2002, now Pat. No. 6,805,359.

(51) Int. Cl.
   *F16L 33/213* (2006.01)
(52) U.S. Cl. ...................................... 24/279
(58) Field of Classification Search ............ 24/277, 24/279, 284; 277/602, 606, 607, 576, 616; 285/236, 237, 230, 420, 421, 214
   See application file for complete search history.

(56) References Cited

U.S. PATENT DOCUMENTS

| 4,097,171 | A | 6/1978 | Fier | 404/26 |
| 4,281,944 | A | 8/1981 | Bowman | 404/26 |
| 4,469,467 | A | 9/1984 | Odill et al. | 404/25 |
| 4,872,780 | A | 10/1989 | Bowman | 404/26 |
| 4,927,290 | A | 5/1990 | Bowman | 404/26 |
| 5,044,822 | A | 9/1991 | Moss | 404/52 |
| 5,209,601 | A * | 5/1993 | Odill et al. | 404/26 |
| RE34,550 | E | 2/1994 | Bowman | 404/26 |
| 5,316,407 | A | 5/1994 | Miller | 404/25 |
| 5,431,459 | A | 7/1995 | Gundy | 285/237 |
| 5,474,396 | A | 12/1995 | Bravo | 404/26 |
| 5,496,128 | A | 3/1996 | Odill | 404/25 |

(Continued)

FOREIGN PATENT DOCUMENTS

JP    2769111    10/1998

OTHER PUBLICATIONS

"Flexible Connectors in Storm Sewers Save Money for Vermont Towns", reprinted from PublicWorks, Jul. 1999.

*Primary Examiner*—James R. Brittain
(74) *Attorney, Agent, or Firm*—Baker & Daniels LLP

(57) ABSTRACT

An expansion ring assembly for sealing a gasket with respect to an annular wall of a rigid structure. The expansion ring assembly includes a drive mechanism for engaging and driving apart the opposing ends of an expansion ring to thereby radially expand the ring. The drive mechanism generally includes a pair of block members, formed of steel or a rigid plastic, for example, having oppositely threaded bores therethrough, and a bolt having oppositely threaded ends which are threaded within respective threaded bores of the block members. The block members are interlockingly engaged with respective opposite ends of the expansion ring. Rotation of the bolt in a first direction simultaneously drives the block members apart from one another along the bolt to radially expand the expansion ring, and rotation of the bolt in a an opposite, second direction simultaneously drives the block members toward one another along the bolt to allow the expansion ring to radially contract.

28 Claims, 21 Drawing Sheets

U.S. PATENT DOCUMENTS

| | | | |
|---|---|---|---|
| 5,529,312 A | 6/1996 | Skinner et al. | 277/9.5 |
| 5,876,039 A | 3/1999 | Skinner et al. | 277/101 |
| 5,954,344 A | 9/1999 | Miller | 277/616 |
| 6,805,359 B1 * | 10/2004 | Neuhaus et al. | 277/576 |
| 2002/0104208 A1 | 8/2002 | Kurdziel et al. | 29/235 |
| 2002/0153668 A1 | 10/2002 | Deeb et al. | 277/606 |

* cited by examiner

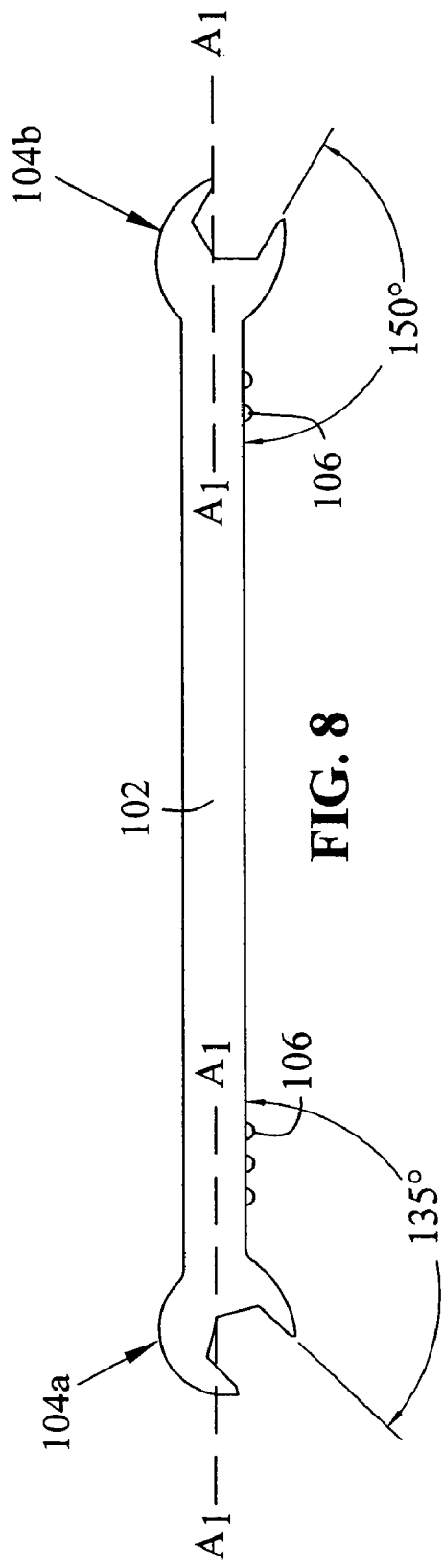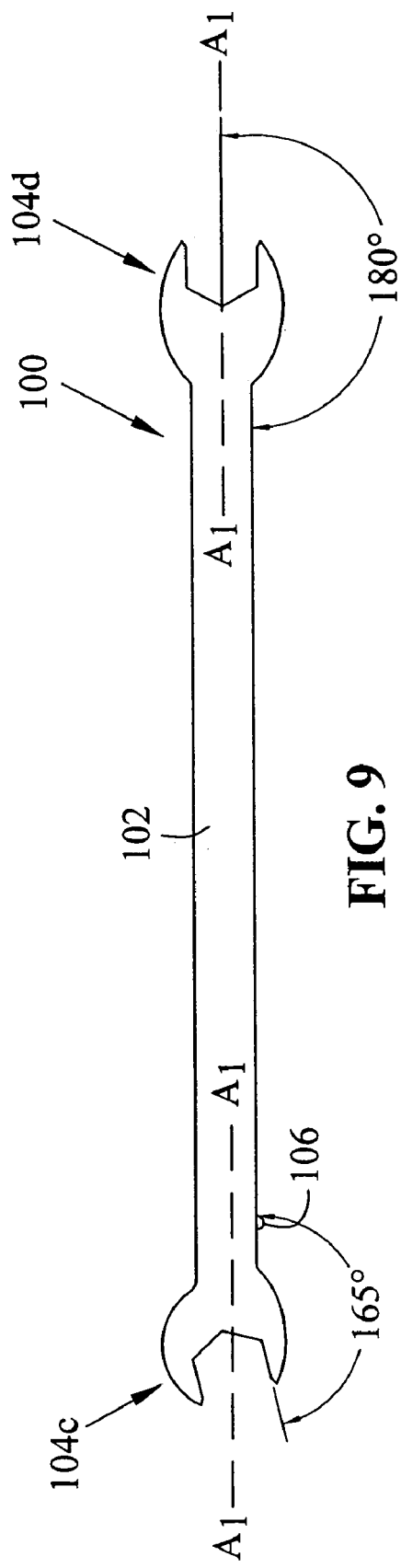

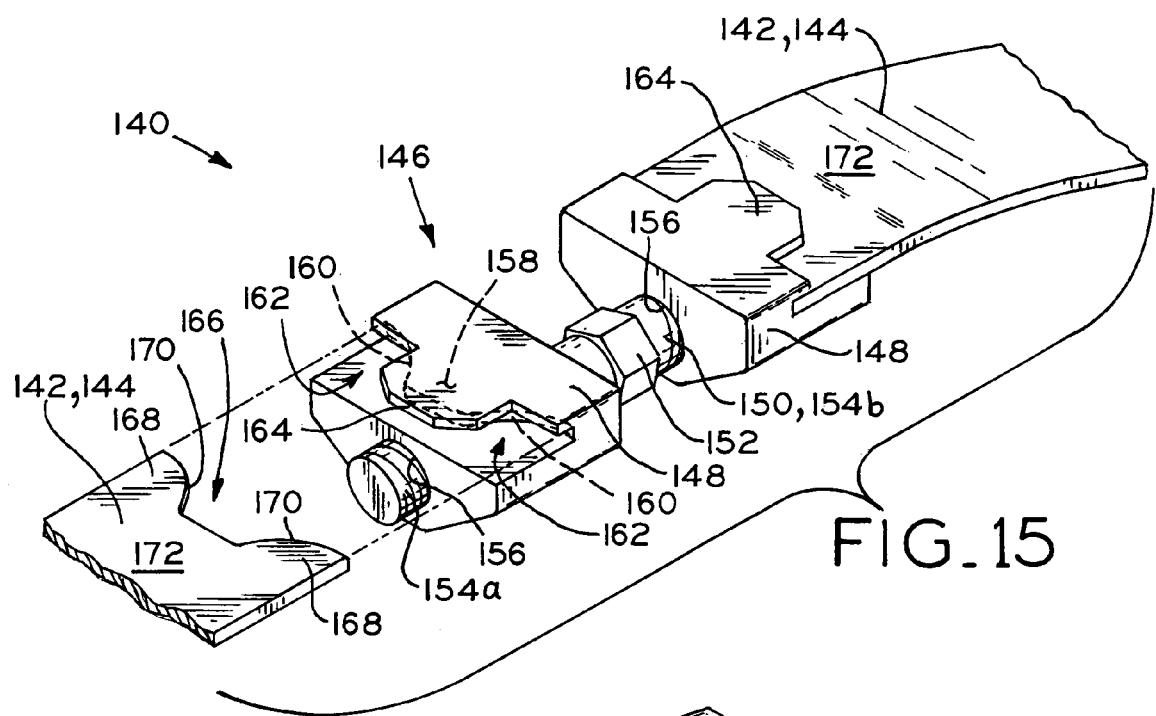
FIG._15
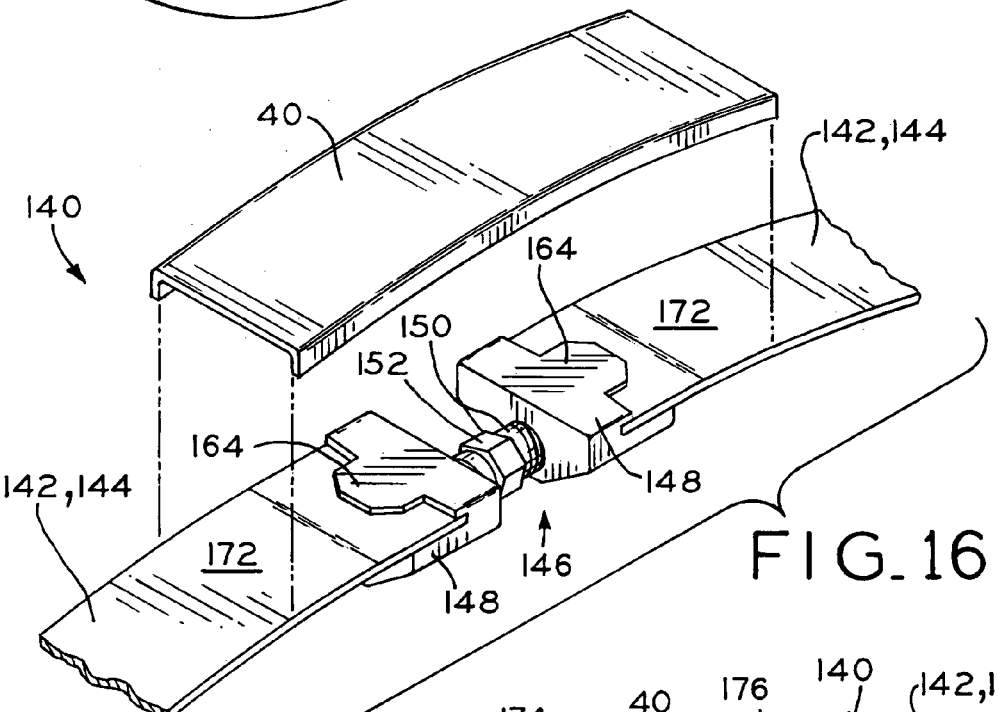
FIG._16
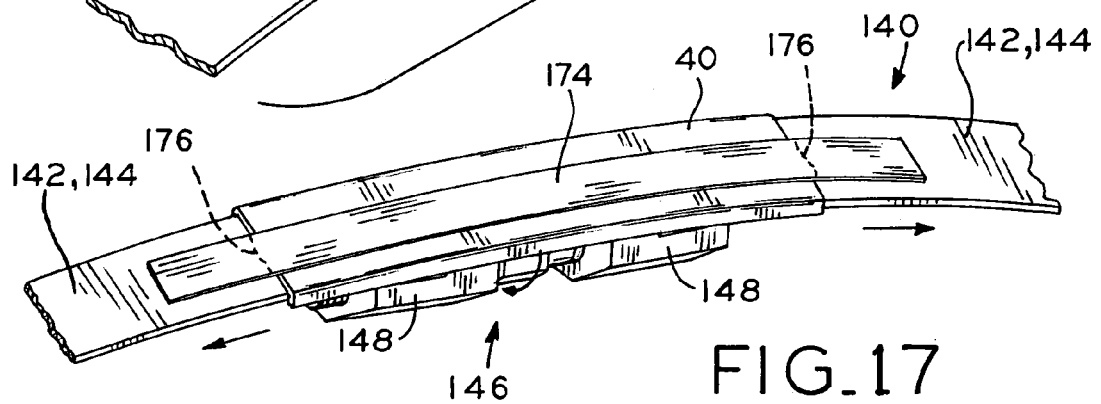
FIG._17

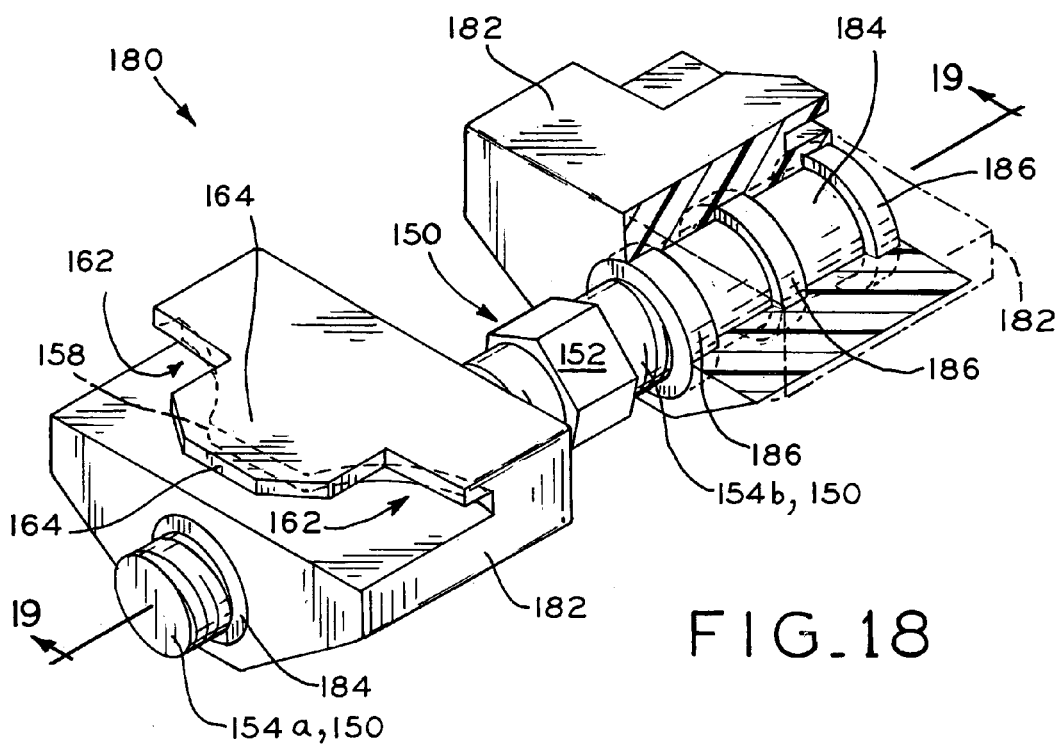
FIG._18
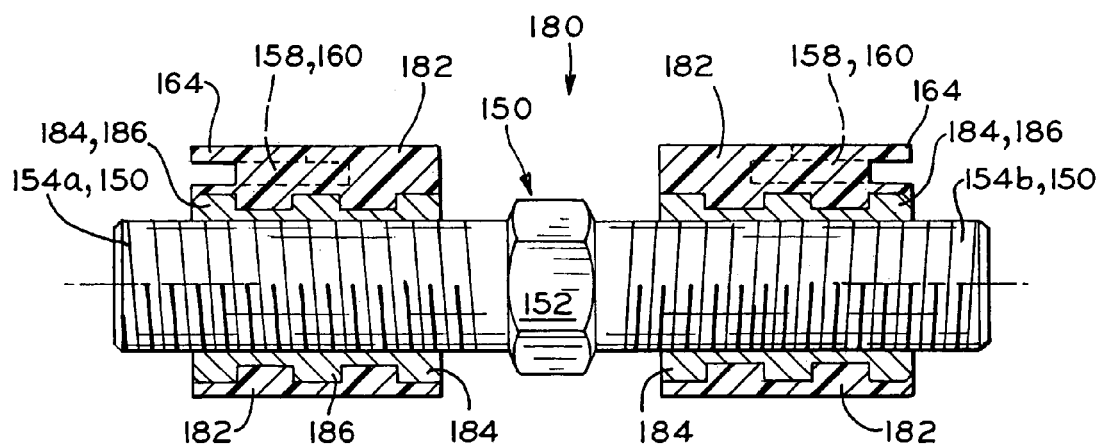
FIG._19

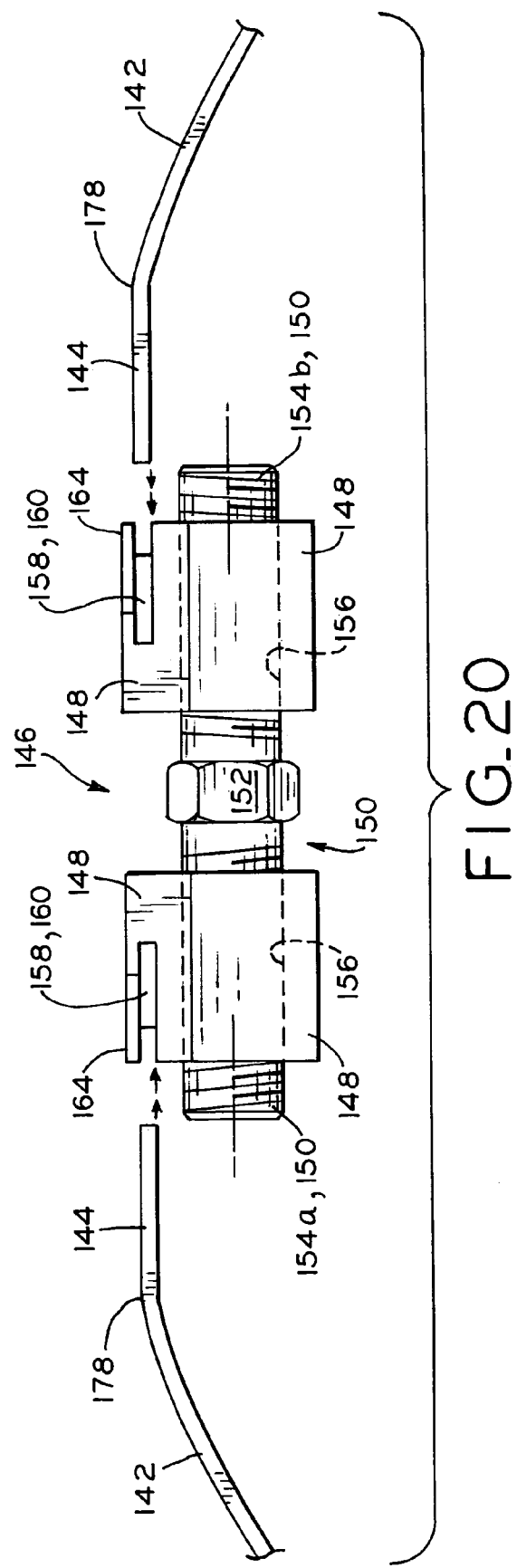

EXPANSION RING ASSEMBLY

CROSS REFERENCE TO RELATED APPLICATIONS

This application is a continuation-in-part of U.S. patent application Ser. No. 10/280,917, entitled EXPANSION RING ASSEMBLY, filed on Oct. 25, 2002, now U.S. Pat. No. 6,805,359.

BACKGROUND OF THE INVENTION

1. Field of the Invention

The present invention relates to an expandable seal arrangement, and associated method, for sealing a gasket to an annular wall of a rigid structure.

2. Description of the Related Art

In underground pipe systems, it is often necessary to connect a pipe in a sealed manner within an opening in the wall of a rigid structure, such as a manhole riser or monolithic base, for example. Typically, a flexible elastomeric gasket is placed within the opening in the wall, followed by fitting an expansion ring against the interior surface of the gasket. Thereafter, a suitable expansion mechanism is used to radially expand the expansion ring and lock same in an expanded condition in which the gasket is sealingly compressed between the expansion ring and the opening in the wall of the structure. Thereafter, a pipe is inserted through the gasket, and one or more clamps are installed around a portion of the gasket which extends from the wall to sealingly compress the extending portion of the gasket between the clamps and the outer surface of the pipe. In this manner, a sealed connection is made between the pipe and the structure.

One known expansion ring includes a ratcheting engagement between overlapping ends of the ring. When the ends of the ring are forced in opposite directions from one another as the ring is radially expanded, ratchet teeth on the ring ends sequentially engage one another, wherein the expansion ring may be sequentially expanded in an incremental manner into multiple locked positions. A separate tool is used to engage the opposite ends of the expansion ring and to drive same apart from one another. Typically, such tools can be expensive, as same are specialized and designed for specific use only with a particular corresponding configuration of the expansion ring.

Although the foregoing expansion rings are effective, the expansion rings may only be expanded in designated increments which may not correspond to an ideal diameter of the expansion ring which is the most effective to sealingly compress the gasket between the expansion ring and an opening in the wall of the structure. For example, a suitable tool may be used to expand the expansion ring to an expanded, locked position in which the gasket is not compressed to its fullest extent between the expansion ring and the opening, yet further expansion of the expansion ring may not be possible because the gasket cannot be further compressed sufficiently to allow for expansion of the expansion ring to the next locked position.

What is needed is an expansion ring mechanism which is an improvement over the foregoing.

SUMMARY OF THE INVENTION

The present invention provides an expansion ring assembly for sealing a gasket with respect to an annular wall of a rigid structure. The expansion ring assembly includes a drive mechanism for engaging and driving apart the opposing ends of an expansion ring to thereby radially expand the ring. The drive mechanism generally includes a pair of block members having threaded bores therethrough, and a bolt having oppositely-threaded ends which are threaded within respective bores of the block members. The bolt additionally includes tool-receiving structure, such as a nut portion, which may be engaged by a suitable tool to rotate the bolt. The block members are respectively engaged with opposite ends of the expansion ring. Rotation of the bolt in a first direction simultaneously drives the block members apart from one another along the bolt to radially expand the expansion ring, and rotation of the bolt in a an opposite, second direction simultaneously drives the block members toward one another along the bolt to allow the expansion ring to radially contract.

Expansion of the expansion ring compresses the gasket between the expansion ring and the opening of the structure to provide a fluid tight seal between the gasket and the structure. Subsequently, a pipe may be inserted through a second portion of the gasket which extends outwardly of the structure, followed by securing the extending portion of the gasket to the outer surface of the pipe using conventional hose clamps or take-up claims, for example.

The present expansion ring assembly may be used in other applications, such as, for example, sealing a gasket about the interface between a manhole base and a manhole frame to prevent water infiltration into a manhole, or for sealing an internal coupling gasket within one or more pipes to prevent water infiltration into a pipeline.

Advantageously, the oppositely-threaded ends of the bolt allow rotation of the bolt in one direction to simultaneously drive the block members apart from each other to expand the expansion ring, such that only one tool need be used to actuate the drive mechanism to expand the expansion ring. Additionally, the screw threaded engagement between the bolt and the block members allows the block members to be driven away from one another along the bolt to an infinitely variable extent based upon the rotational position of the bolt. Therefore, the expansion ring may be expanded to a precise point wherein the gasket is firmly and sufficiently compressed between the expansion ring and the opening of the structure to provide a fluid tight seal.

The expansion ring may also be further expanded after initial installation, if needed, to tighten the seal of the gasket by simply engaging a tool with the bolt of the drive mechanism and rotating same to drive the block members apart from one another to further expand the expansion ring. A further advantage of the expansion ring assembly is the ability to remove the assembly from the structure if needed, followed by re-installing the assembly in a different position, or by re-using the assembly by installing same in a different structure or using same in a different application.

Additionally, a plurality of specially configured wrenches are provided, which include socket ends having a varying angular orientation, allowing a suitable socket end to be engaged with the nut portion of the bolt of the drive mechanism when the drive mechanism is in a small clearance space, regardless of the rotational position of the nut portion. Further, a wrench is provided which includes a socket end having an internal notch which facilitates ratcheting movement of the socket end of the wrench with respect to the nut portion of the bolt, thereby allowing rotation of the bolt without complete removal of the wrench from the bolt between wrench turns. The wrench may be configured with a pair of plates attached to the sides of the socket end of the wrench, which engage the sides of the nut portion to prevent the socket end from slipping off of the nut portion as the nut portion is rotated.

In a further embodiment, the expansion ring assembly includes a pair of end portions which interlockingly engage the block members of the drive mechanism. The end portions of the expansion ring each include a notch defining a pair of first projections, the first projections received within undercut portions in the block members, with second projections of the block members received within the notches in the end portions of the expansion ring. Additionally, lip portions of the block members overlap the outer surfaces of the expansion ring ends. In this manner, the end portions of the expansion ring are interlockingly engaged with the block members to prevent relative lateral movement between the expansion ring end portions and the block members, such that the end portions of the expansion ring are confined for movement only in a radially outward, expanding direction.

Further, an oversleeve may be used with the foregoing drive mechanism, the oversleeve temporarily secured to the end portions of the expansion ring with a strip of tape. The tape strip conveniently secures the expansion ring ends, block members of the drive mechanism, and oversleeve to one another in a temporary manner until the drive mechanism is actuated in the field to expand the expansion ring assembly and thereby break the tape strip.

According to a still further embodiment, the block members of the drive mechanism may be formed of a rigid plastic material, with each block member including a threaded metal insert which may be insert molded within the block member when the block member is formed. In this manner, the total amount of steel material needed to form the block members is reduced, thereby reducing the overall cost of the expansion ring assembly.

In one form thereof, the present invention provides an expansion ring assembly, including a ring including a pair of end portions; and a drive mechanism, including a pair of plastic block members each having a threaded insert therein, the inserts of the block members being oppositely threaded, the block members connected to respective end portions of the ring; and a bolt including oppositely-threaded ends respectively threaded within the inserts of the block members, wherein rotation of the bolt in a first direction causes the block members to be simultaneously driven apart from one another to thereby expand the ring.

In another form thereof, the present invention provides an expansion ring assembly, including a ring including a pair of end portions, each end portion including first interlocking structure; and a drive mechanism, including a pair of block members each having second interlocking structure and a threaded bore therein, the bores of the block members being oppositely threaded, the first interlocking structures of the ring end portions removably engaged with respective second interlocking structures of the block members; and a bolt including oppositely-threaded ends respectively threaded within the bores of the block members, wherein rotation of the bolt in a first direction causes the block members to be simultaneously driven apart from one another to thereby expand the ring.

In another form thereof, the present invention provides an expansion ring assembly, including a ring including a pair of end portions; and a drive mechanism including a pair of block members each having a threaded bore therethrough, the bores of the block members being oppositely threaded, the block members connected to respective end portions of the ring, and a bolt including oppositely-threaded ends respectively threaded within the bores of the block members; an oversleeve member disposed externally of the ring and overlapping the end portions of the ring; and a tape strip adhesively secured over the oversleeve member and at least one of the end portions of the ring; wherein rotation of the bolt in a first direction causes the block members to be driven away from one another to thereby drive the end portions of the ring away from one another and break the tape strip.

In another form thereof, the present invention provides an expansion ring assembly, including a ring including a pair of end portions; and a drive mechanism, including a pair of block members each having a threaded bore therein, the bores of the block members being oppositely threaded, the end portions of the ring removably engaged with respective the block members; and a bolt including oppositely-threaded ends respectively threaded within the bores of the block members, wherein rotation of the bolt in a first direction causes the block members to be simultaneously driven apart from one another to thereby expand the ring.

BRIEF DESCRIPTION OF THE DRAWINGS

The above-mentioned and other features and advantages of this invention, and the manner of attaining them, will become more apparent and the invention itself will be better understood by reference to the following description of embodiments of the invention taken in conjunction with the accompanying drawings, wherein:

FIG. 8 is an elevational view of a first wrench useful to actuate the drive mechanism of the expansion ring FIG. 7;

FIG. 9 is an elevational view of a second wrench useful to actuate the drive mechanism of the expansion ring FIG. 7;

FIG. 15 is a partial perspective view of a portion of an expansion ring assembly according to a further embodiment, showing the interlocking engagement between the end portions of the expansion ring with the block members of the drive mechanism;

FIG. 16 is a partial perspective view of the portion of the expansion ring assembly of FIG. 15, showing the end portions of the expansion ring interlockingly engaged with the block members of the drive mechanism, and further showing attachment of the oversleeve;

FIG. 17 is a partial perspective view of the portion of the expansion ring assembly of FIG. 16, further showing a strip of tape secured in an overlapping manner over the end portions of the expansion ring and the oversleeve to temporarily secure the components of the expansion ring assembly before filed installation;

FIG. 18 is a perspective view of a drive mechanism according to a further embodiment, wherein the block members of the drive mechanism are formed of a rigid plastic material and include threaded inserts;

FIG. 19 is a sectional view taken along line 19—19 of FIG. 18; and

FIG. 20 is a side view of the portion of the expansion ring assembly of FIGS. 15–17, showing the end portions of the expansion ring bent radially inwardly.

Corresponding reference characters indicate corresponding parts throughout the several views. The exemplifications set out herein illustrate preferred embodiments of the invention, and such exemplifications are not to be construed as limiting the scope of the invention any manner.

DETAILED DESCRIPTION

Figure 1A:
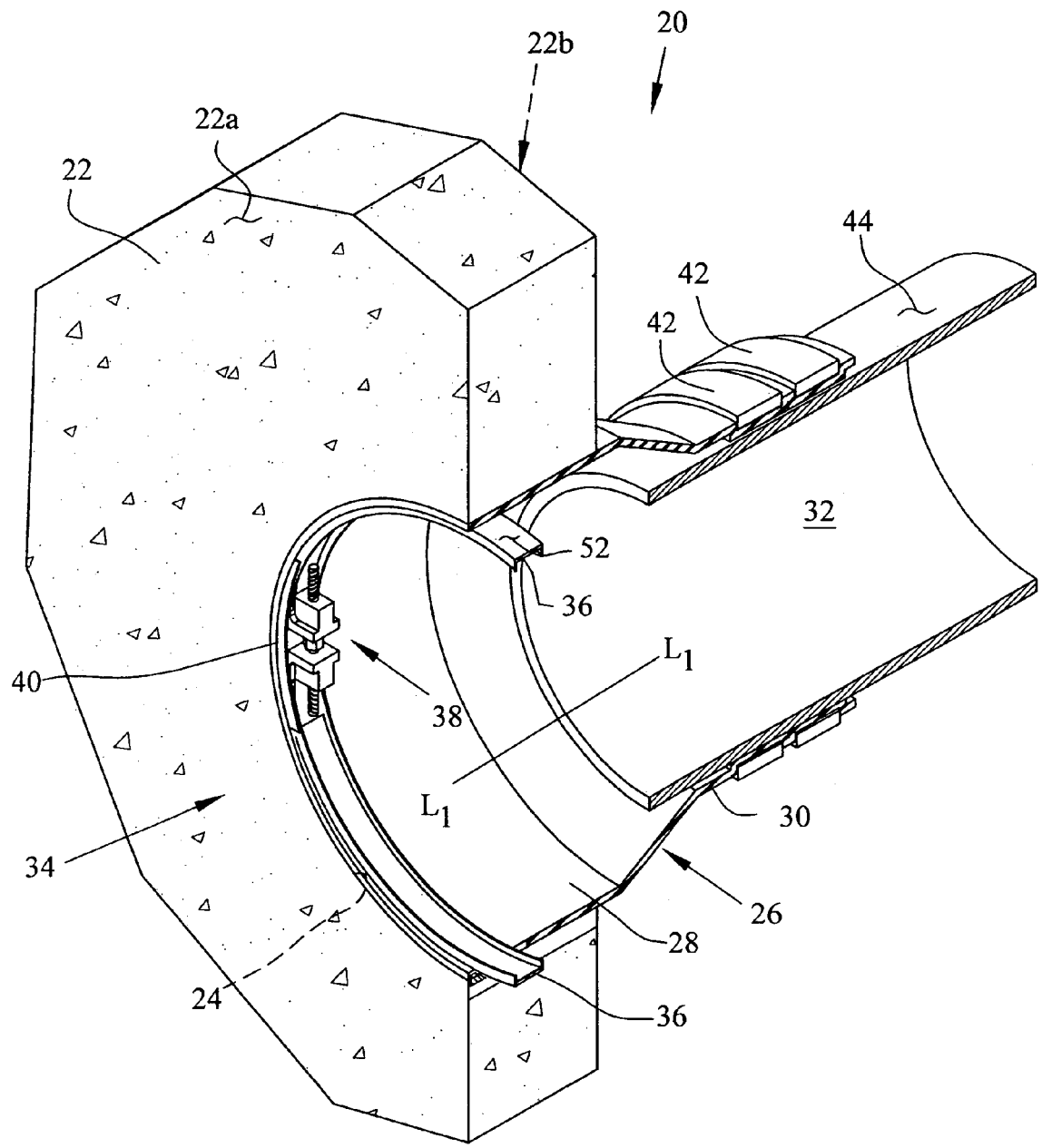
FIG. 1A is a partial sectional view of a connection between a concrete structure and a pipe, wherein a wall of the concrete structure includes an opening into which a gasket is sealingly fitted with an expansion ring assembly according to the present invention, and further showing a pipe sealingly connected to the gasket.

Referring to FIG. 1A, pipe connection 20 in an underground pipe system is shown, in which a pipe is connected to a structure, such as a manhole riser or monolithic base, for example. The structure may be formed of concrete, fiberglass, or any other suitable rigid material. The structure includes wall 22 having interior side 22a defining the interior of the structure, and exterior side 22b defining the exterior of the structure. Additionally, wall includes opening 24 therein. An annular gasket 26 includes a first portion 28 disposed within opening 24 of wall 22, and a second portion 30 extending from first portion 28. Gasket 26 may be made from a flexible, elastomeric material such as rubber or neoprene, for example, and provides a sealing connection between opening 24 in wall 22 of the structure and a pipe 32. First portion 28 of gasket 26 is sealingly engaged with opening 24 of wall 22 by expansion ring assembly 34, which generally includes expansion ring 36, drive mechanism 38, and oversleeve 40. As discussed in detail below, expansion ring assembly 34 is radially expandable to compress gasket 26 into sealing engagement with opening 24 in wall 22 to provide a fluid tight seal therebetween.

After first portion 28 of gasket 26 is sealingly engaged with opening 24 of wall 22 by expansion ring assembly 34, second portion 30 of gasket 26 is connected to pipe 32 by inserting pipe 32 therethrough, followed by installing one or more clamps 42 around second portion 30 of gasket 26 and tightening clamps 42 to compress second portion 28 of gasket 26 into sealing engagement with outer surface 44 of pipe 32 to provide a fluid tight seal therebetween. Second portion 30 of gasket 26 may include annular recessed seats 46 for receipt of clamps 42 to locate clamps 42 on second portion 30 of gasket 26.

In FIG. 1A, only a portion of the length of pipe 32 is shown for clarity, it being understood that pipe 32 typically extends past expansion ring assembly 34 through opening 24 in wall 22, past inner surface 22a of wall 22, and into the interior of the structure. Also, expansion ring assembly 34 is shown in FIG. 1A with drive mechanism 38 disposed in a nine o'clock position with respect to opening 24 for clarity. However, expansion assembly 34 may be selectively configured with drive mechanism 38 oriented in any desired position around the circumference of opening 24, it being noted that a configuration with drive mechanism 38 disposed in a twelve o'clock position is favored in many applications. Further, the pipe connection of FIG. 1A may installed in a manner in which second portion 30 of gasket 26 extends inward of wall 22, in essentially the opposite manner shown in FIG. 1A, such that clamps 42 are disposed within the structure.

Figure 1B:
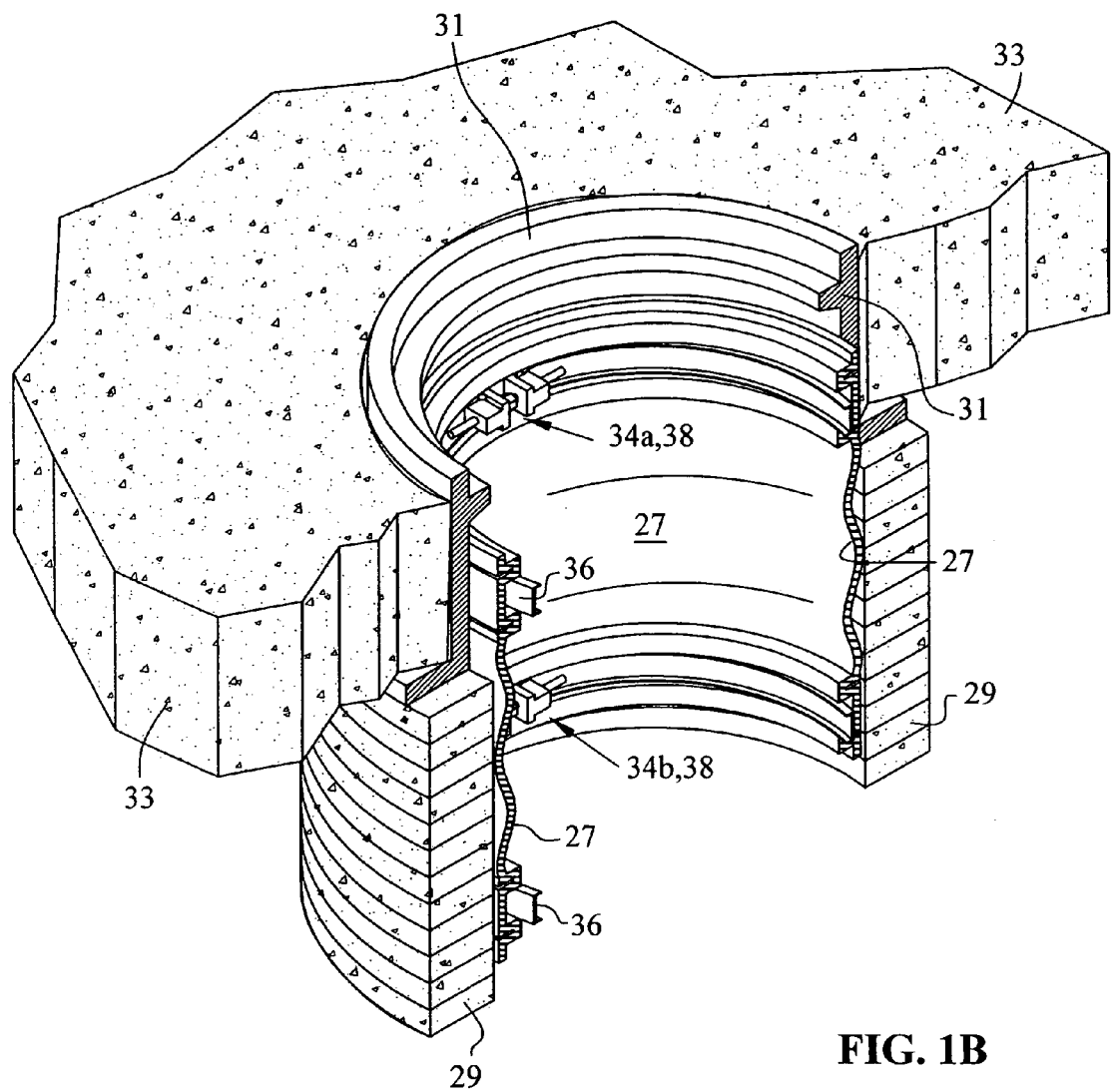
FIG. 1B is a partial sectional view of a connection between a manhole frame and a manhole base disposed beneath a pavement surface, showing a gasket sealingly connecting the manhole base and the manhole frame using a pair of expansion ring assemblies according to the present invention to prevent water infiltration into the manhole.

Although expansion ring assembly 34 is shown in FIG. 1A in an application in which expansion ring assembly 34 is used to seal a gasket within an opening in the wall of a structure, expansion ring assembly 34 may also be used in many other applications. For example, in FIG. 1B, a pair of expansion ring assemblies 34a and 34b are used to seal gasket 27 about an interface between manhole base 29 and a manhole frame 31 disposed beneath pavement surface 33. Specifically, an upper expansion ring assembly 34a is used to press an upper portion of gasket 27 into sealing engagement with manhole frame 31, and a lower expansion ring assembly 34b is used to press a lower portion of gasket 27 into sealing engagement with manhole base 29. In this manner, water infiltration into manhole base 29 is prevented, regardless of whether relative movement occurs between manhole frame 31 and manhole base 29.

Figure 1C:
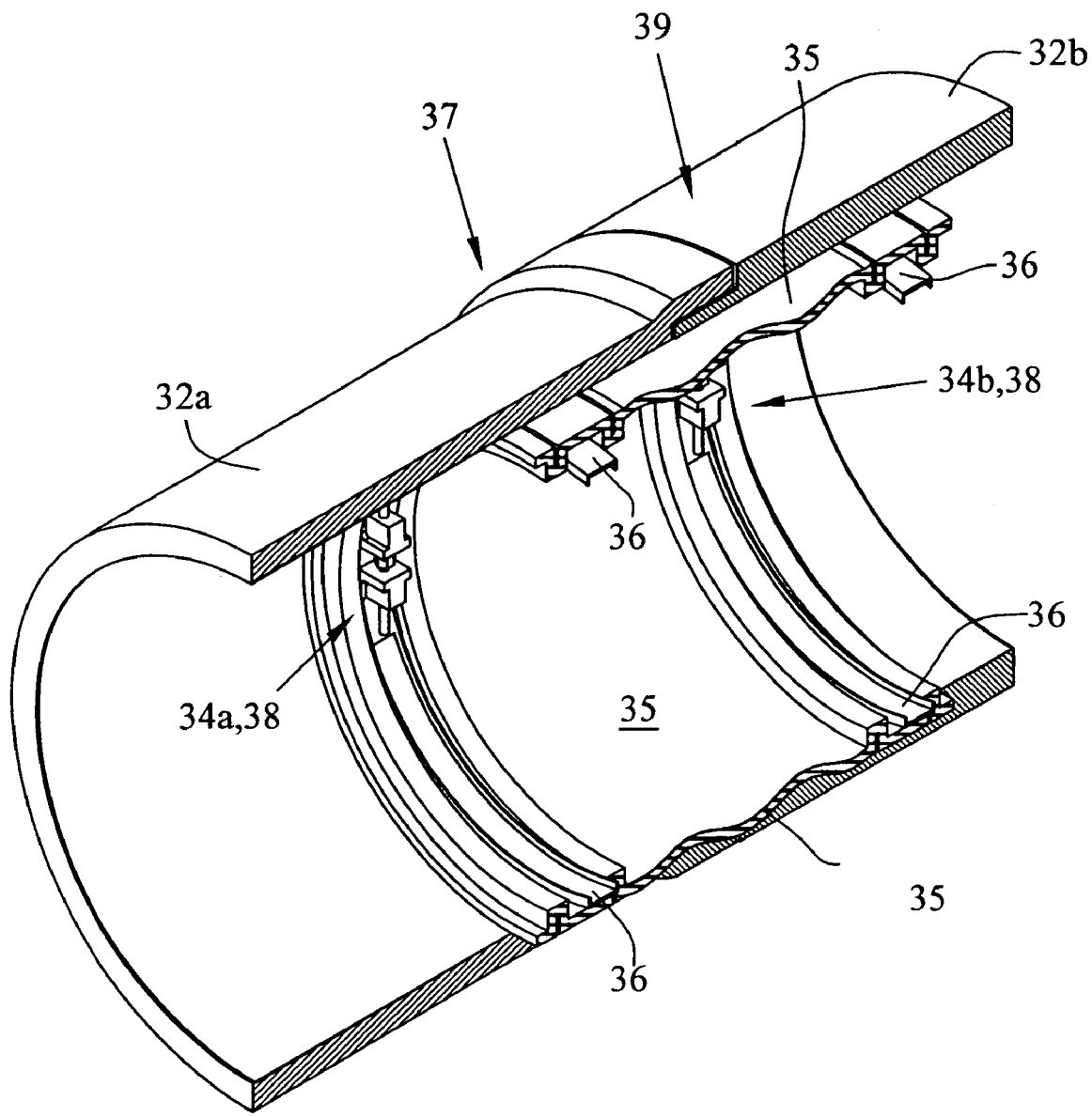
FIG. 1C is a partially exploded view of a pipe-to-pipe connection which includes an internal pipe coupler therebetween, the internal pipe coupler including a pair of expansion ring assemblies according to the present invention to prevent water infiltration into the pipes.

In FIG. 1C, a pair of expansion ring assemblies 34a and 34b are used with an internal coupling gasket 35 for sealing a connection between the female or bell end 37 of a first pipe 32a and the male or spigot end 39 of a second pipe 32b. Specifically, a first expansion ring mechanism 34a presses one end of gasket 35 into sealing engagement with bell end 37 of pipe 32a, and a second expansion ring assembly presses an opposite end of gasket 35 into sealing engagement with spigot end 39 of pipe 32b to prevent water infiltration into the pipes if or when the primary bell-spigot connection between pipes 32a and 32b fails. Alternatively, expansion ring assemblies 34a and 34b may be used with an internal coupling gasket 35 to bridge and seal a crack or leak disposed anywhere along a single pipe 32 within a pipeline.

Thus, expansion ring assembly 34 may be used in any application which generally involves the radial expansion of a flexible gasket into sealing engagement with a rigid structure. The details and operation of expansion ring assembly 34 are discussed below.

Figure 2:
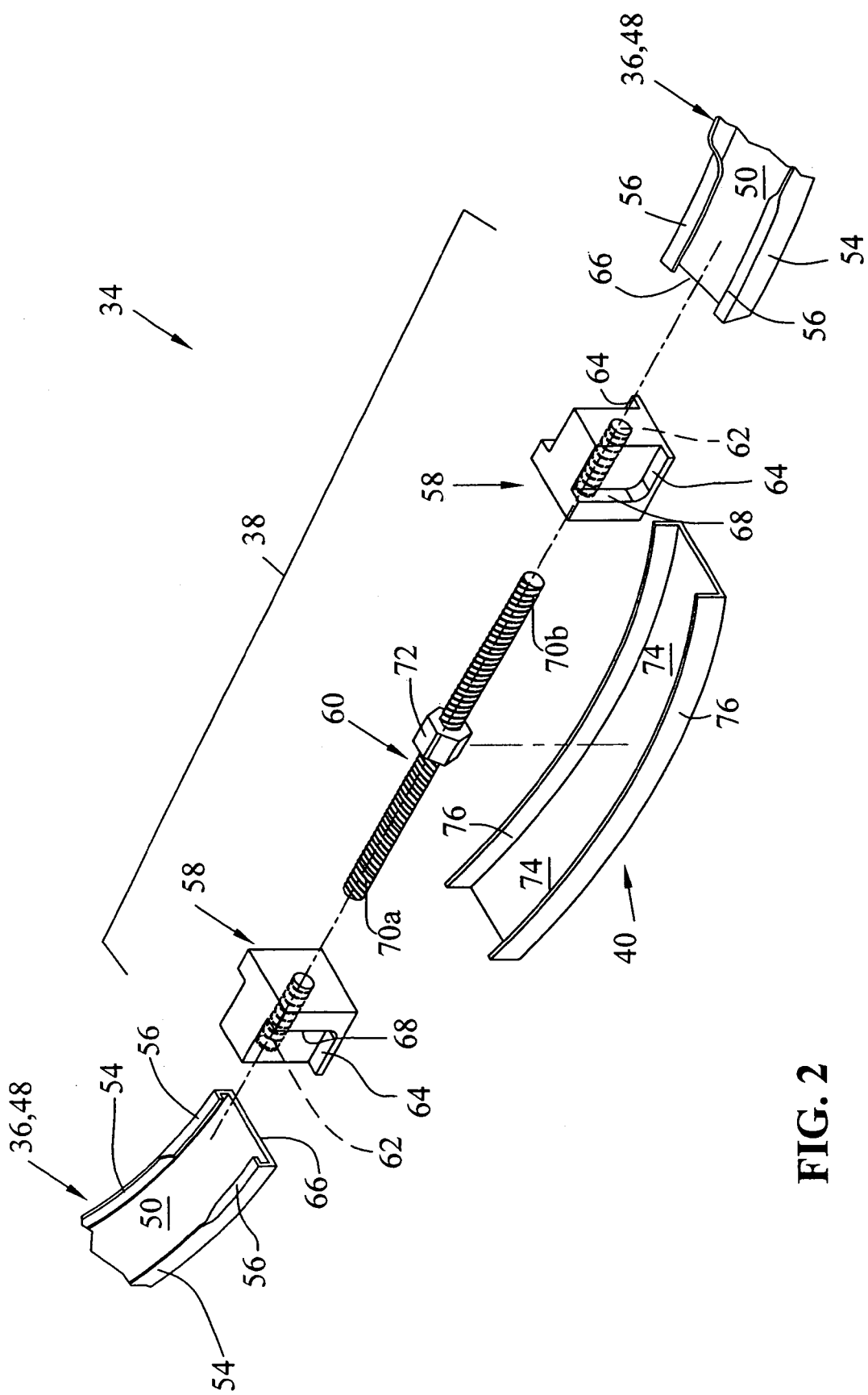
FIG. 2 is an exploded, fragmentary view of the expansion ring assembly of FIG. 1A, showing the expansion ring ends, the drive mechanism, and the oversleeve.

Referring to FIG. 2, a first embodiment of expansion ring assembly 34 is shown. Expansion ring 36 is made of a continuous strip of material, such as stainless steel, other metals, or a plastic, for example, and includes opposite ends 48. Expansion ring 36 includes a generally planar base wall 50 having outer surface 52 (FIG. 1A) for engaging the interior surface of a gasket, and side walls 54 projecting inwardly from base wall 50. Base wall 50 and side walls 54 together define a generally U-shaped cross-sectional profile; however, the overall shape of expansion ring 36 may vary. As shown in FIG. 2, ends 48 of expansion ring include crimped portions 56.

Drive mechanism 38 generally includes a pair of block members 58 and bolt 60. Block members 58 each include threaded bore 62 and a pair of shoulders 64 on opposite sides thereof. The bores 62 of a pair of block members 58 of each drive mechanism 38 are oppositely threaded, for reasons discussed below. Block members 58 are removably attached to respective ends 48 of expansion ring 36 by sliding shoulders 64 within crimped portions 56 of ends 48 of expansion ring 36 until front edges 66 of expansion ring ends 48 abut ledges 68 of block members 58. The foregoing connection configuration between block members 58 and ends 48 of expansion ring 36 is exemplary, it being understood that many other types of configurations for removably connecting block members 58 to ends 48 of expansion ring 36 may be devised, as discussed below.

Bolt 60 includes oppositely-threaded ends 70a and 70b; for example, end 70a has right-hand threads and end 70b has left-hand threads, or vice-versa. Bolt 60 additionally includes a suitable tool-receiving fitting between bolt ends 70a and 70b, such as hexagonal nut portion 72 integrally formed with bolt 60. Although nut portion 72 is shown herein as having a hexagonal configuration, i.e., having six sides, other shapes for nut portion are possible, wherein nut portion may have four, five, six, or more sides, for example. Bolt ends 70a and 70b are threadingly engaged within the corresponding threaded bores 62 of block members 58 to connect block members 58 to bolt 60.

Oversleeve 40 is formed of a segmented strip of material, such as stainless steel, other metals, or a plastic. Similar to expansion ring 36, oversleeve 40 includes base wall 74 and a pair of side walls 76 extending therefrom to define a U-shaped cross-sectional profile complementary to that of expansion ring 36, as described above. The distance between side walls 76 of oversleeve 40 is slightly wider than the corresponding distance between side walls 54 of expansion ring 36, such that ends of 48 expansion ring 36 may nest within oversleeve 40 between side walls 76 of oversleeve 40, as shown in FIG. 3.

Figure 3:
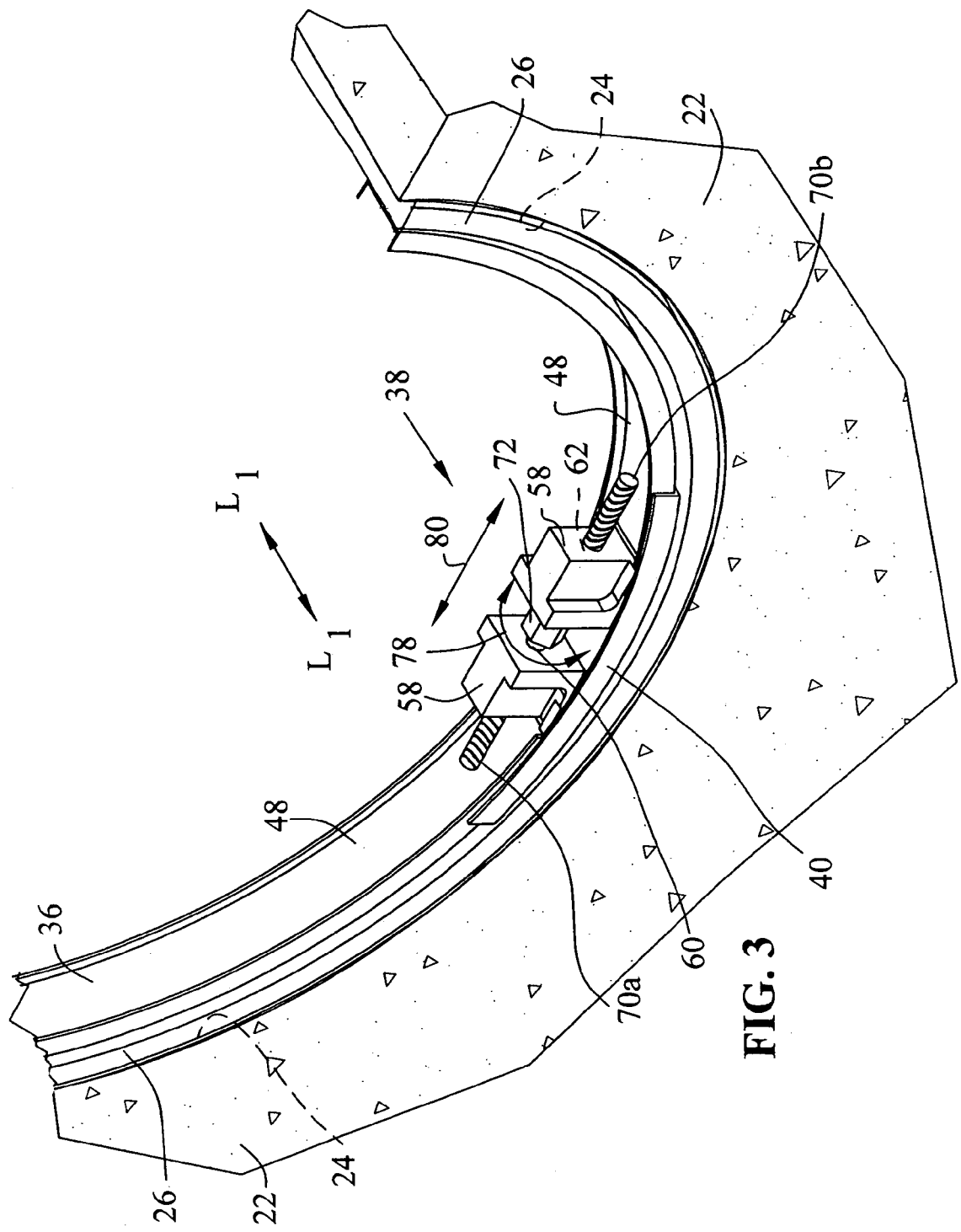
FIG. 3 is a fragmentary perspective view of the pipe connection of FIG. 1A, showing the actuation of the drive mechanism to expand the expansion ring.

Referring to FIG. 3, gasket 26 is shown disposed within opening 24 in wall 22, and expansion ring assembly 34 is shown fitted within the interior of gasket 26. Block members 58 of drive mechanism 38 are received within respective ends 48 of expansion ring 36, and ends 48 of expansion ring 36 are nested within oversleeve 40, which overlaps ends 48 of expansion ring 36 and spans the gap therebetween which is bridged by drive mechanism 38. Drive mechanism 38 is oriented such that bolt 60 is disposed perpendicular to longitudinal axis $L_1$—$L_1$ (FIGS. 1A and 3) which axis is common to expansion ring 36, gasket 26, and opening 24. A suitable tool, such as an open-end wrench or a torque wrench, for example, is engaged with nut portion 72 of bolt 60 and used to rotate bolt 60 in a first direction as illustrated by arrow 78. Upon rotation of bolt 60, the threaded engagement between bolt ends 70a and 70b and threaded bores 62 of block members 58 drives block members 58 simultaneously away from one another along bolt 60, thereby forcing ends 48 of expansion ring 36 apart from one another to expand the diameter of expansion ring 36.

During such expansion, oversleeve 40 prevents relative lateral movement between ends 48 of expansion ring 36, such that ends 48 of expansion ring 36 are constrained to move apart from one another only along the direction indicated by arrow 80. The expansion of expansion ring 36 compresses gasket 26 between expansion ring 36 and opening 24 in wall 22 to provide a fluid tight seal between gasket 26 and wall 22. Bolt 60 may also be rotated in a second direction opposite the first direction along arrow 78 if needed, which simultaneously drives block members 58 toward one another along bolt 60, thereby allowing expansion ring 36 to contract. In this manner, expansion ring assembly 34 may be removed after installation if necessary, in order to reposition expansion ring assembly 34 or alternatively, to re-use expansion ring assembly 34 in another installation or application.

Advantageously, the threaded engagement between the oppositely-threaded ends 70a and 70b of bolt 60 and block members 58 simultaneously drives block members 58 apart from one another along bolt 60 such that only a single tool need be used to actuate drive mechanism 38. A single turn of a wrench, for example, drives both block members 58 apart from one another simultaneously, such that block members 58 need not be separately adjusted. Thus, the simultaneous use of multiple wrenches, as well as multiple manual adjustment steps, is avoided. Additionally, the threaded engagement between bolt ends 70a and 70b and block members 58 allows an infinitely variable degree of adjustment of drive mechanism 38, such that expansion ring 36 may be selectively expanded to any desired extent. In this manner, expansion ring assembly 34 can accommodate gaskets 26 of varying nominal sizes, and further, can also accommodate irregularities or size variations between gaskets 26 of the same nominal size.

Figure 4:
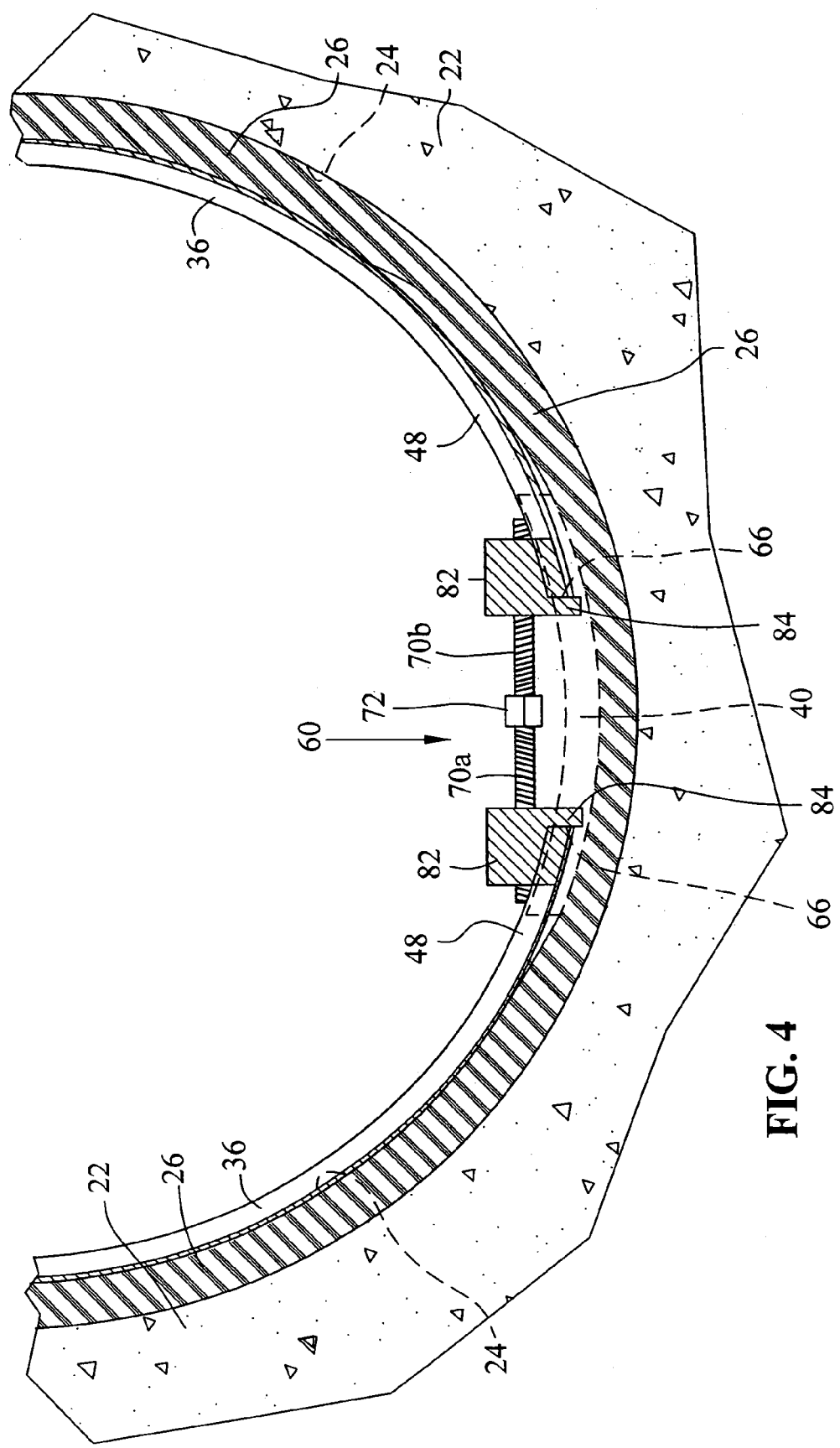
FIG. 4 is a fragmentary elevational view of a gasket within an opening in the wall of a concrete structure, showing an expansion ring assembly according to an alternative embodiment.

Referring to FIGS. 4–6B, several alternative embodiments of drive mechanism 38 are shown. Referring first to FIG. 4, block members 82 are similar to block members 58 shown in FIGS. 1A–3, and include foot portions 84 extending therefrom. Foot portions 84 are in abutment with front edges 66 of ends 48 of expansion ring 36 such that, as bolt 60 is rotated, foot portions 84 of block members 82 drive ends 48 of expansion ring 36 apart from one another to radially expand expansion ring 36. Additionally, oversleeve 40 is provided for receiving ends 48 of expansion ring 36 and to prevent relative lateral movement between ends 48 during the radial expansion of expansion ring 36, as described above.

Figure 5:
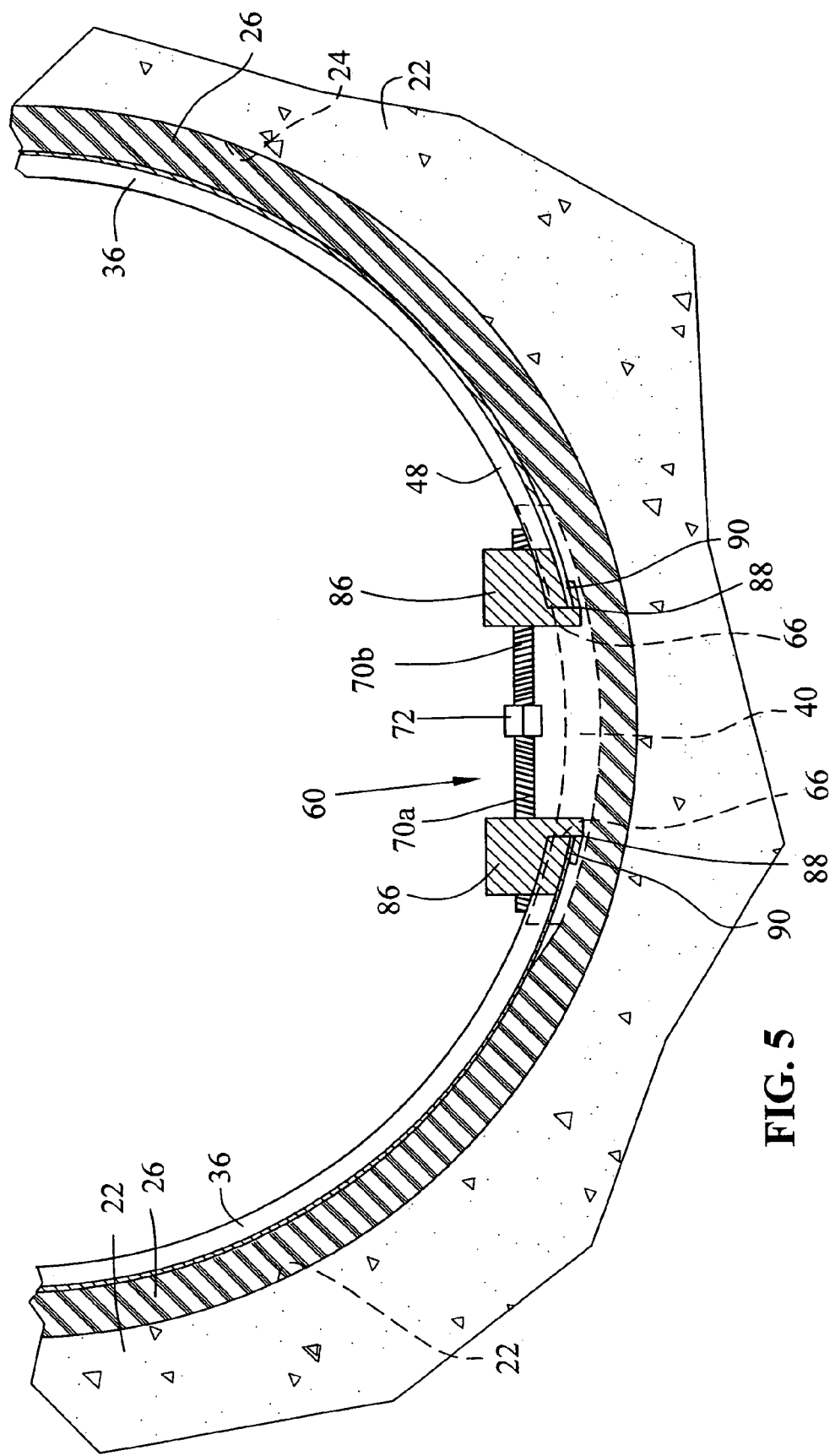
FIG. 5 is a fragmentary elevational view of a gasket within an opening in the wall of a concrete structure, showing an expansion ring assembly according to an additional alternative embodiment.

Referring to FIG. 5, block members 86 are also similar to block members 58 shown in FIGS. 1A–3, and include projections 88 extending therefrom which define notches 90 in which ends 48 of expansion ring 36 are received such that, as bolt 60 is rotated, projections 88 drive ends 48 of expansion ring 36 apart from one another to radially expand expansion ring 36. Additionally, oversleeve 40 is provided for receiving ends 48 of expansion ring 36 and to prevent relative lateral movement between ends 48 during the radial expansion of expansion ring 36, as described above.

Figure 6A:
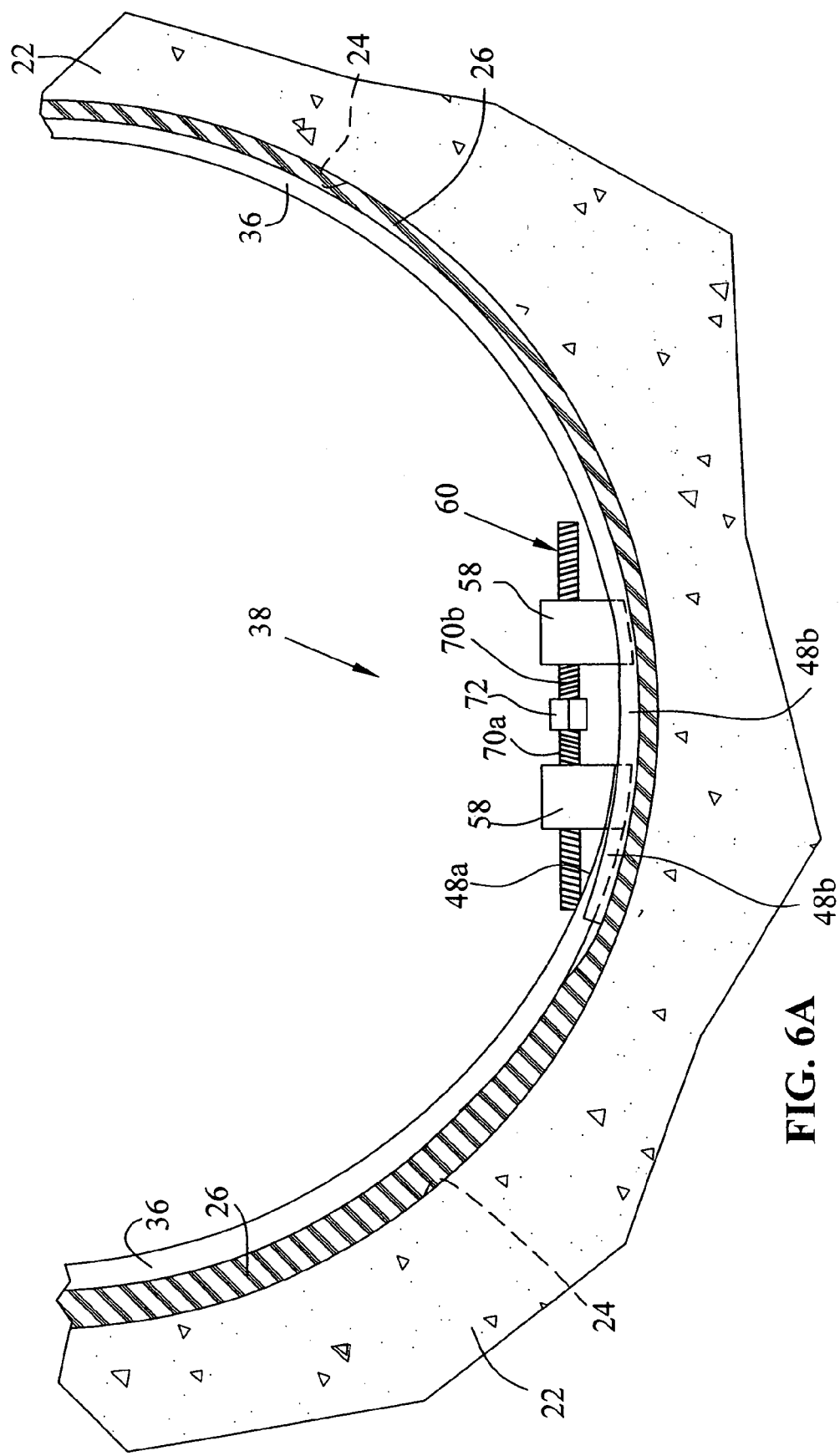
FIG. 6A is a fragmentary elevational view of a gasket within an opening in the wall of a concrete structure, showing an expansion ring assembly according to a further alternative embodiment.
Figure 6B:
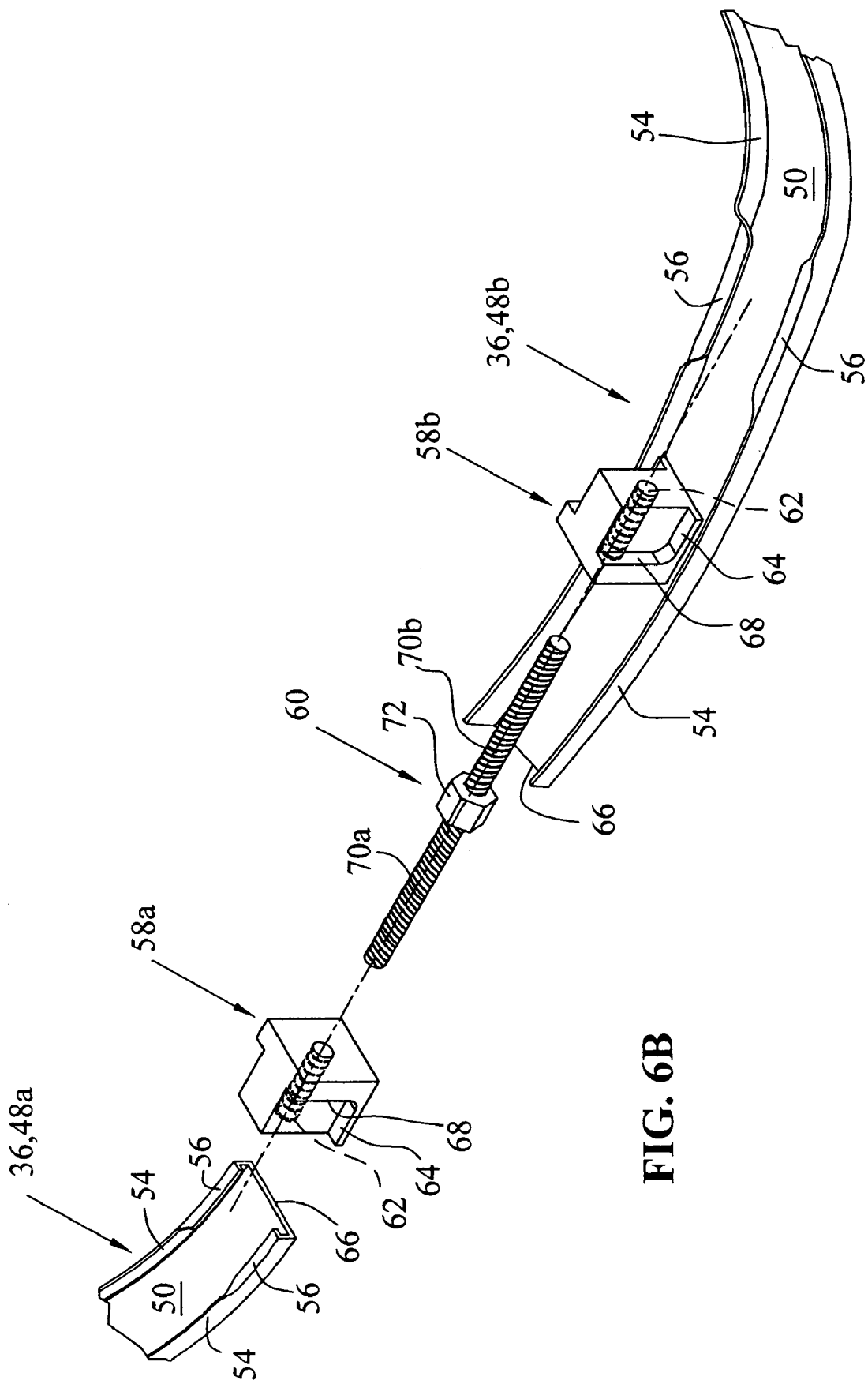
FIG. 6B is an exploded, fragmentary view of the expansion ring assembly of FIG. 6A, showing the expansion ring ends and the drive mechanism.

Referring to FIGS. 6A and 6B, ends 48 of expansion ring 36 may overlap one another, with a first end 48a nested within, and slidable with respect to, a second end 48b. Otherwise, the overall shape and cross-sectional profile of expansion ring 36 is the same as that shown in FIGS. 1A–3. Drive mechanism 38 includes a first block member 58a attached to first end 48a of expansion ring 36, and second block member 58b attached to second end 48b of expansion ring 36. Referring to FIG. 6b, block member 58a is attached to end 48a of expansion ring 36 by sliding shoulders 64 within crimped portion 56 of end 48a until front edge 66 of end 48a abuts ledges 68 of block member 58a. Block member 58b is attached to crimped portion 56 of end 48b in the same manner; however, crimped portion 56 of end 48b is disposed inwardly of front edge 66 a suitable distance to allow overlap between ends 48a and 48b of expansion ring 36. Alternatively, block member 58b may be attached to end 48b in another suitable manner, such as with one or more fasteners, or end 48b may be formed with a tab projecting from the base wall 50 thereof which is drivingly engaged by block member 58b.

Referring to FIG. 6A, rotation of bolt 60 of drive mechanism 38 simultaneously drives block members 58a, 58b away from one another as described above to radially expand expansion ring 36, wherein during such expansion, first end 48a is slidable with respect to second end 48b. The nesting engagement between first end 48a and second end 48b prevents relative lateral movement therebetween during the expansion of expansion ring 36, such that oversleeve 40 is not needed with the embodiment of expansion ring shown in FIGS. 6A and 6B, in which ends 48a and 48b overlap one another.

Figure 10A:
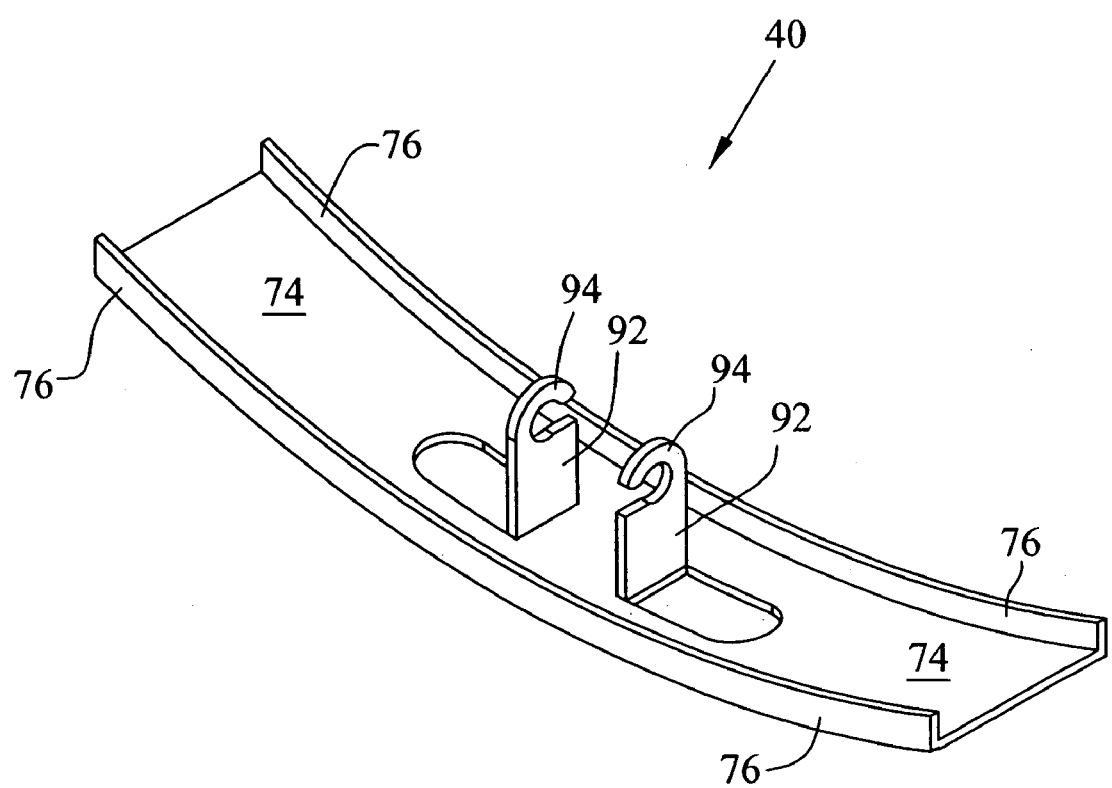
FIG. 10A is a perspective view of an oversleeve including a pair of retention members formed therein.
Figure 10B:
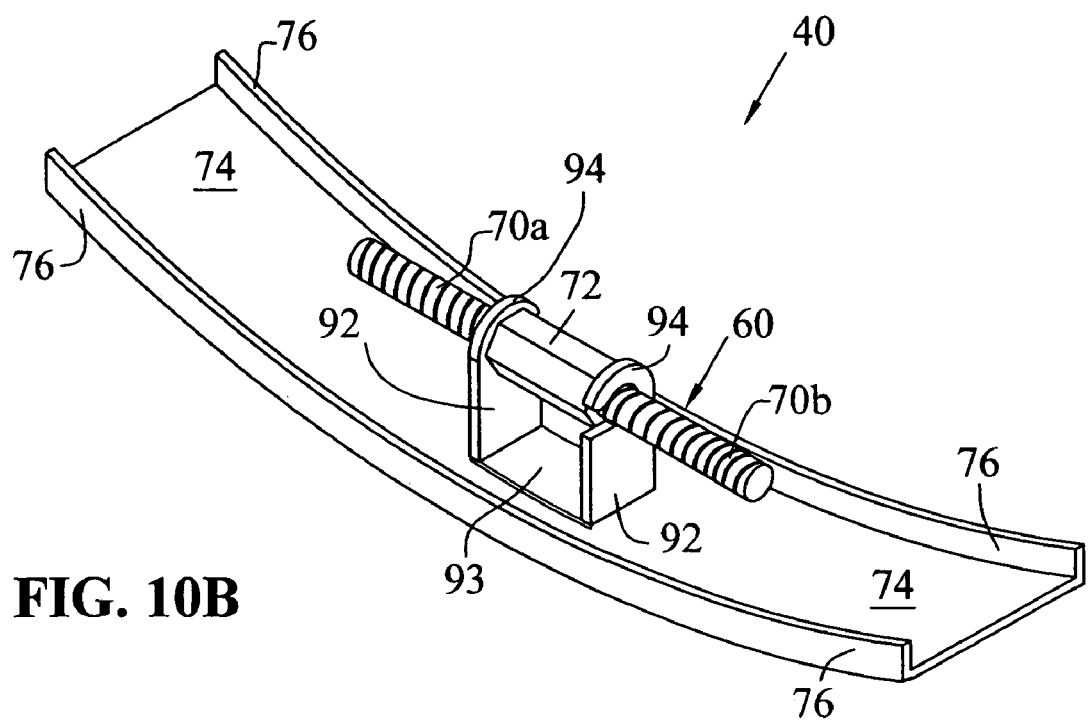
FIG. 10B is a perspective view of an oversleeve including a retention bracket welded thereto.

Referring to FIG. 10A, oversleeve 40 may optionally include a pair of retention members 92 extending therefrom. Retention members 92 may be initially punch-formed in base wall 74 of oversleeve 40, followed by bending retention members 92 outwardly from base wall 74 such that retention members 92 extend generally perpendicular to base wall 74. Alternatively, as shown in FIG. 10B, retention members 92 may comprise portions of a separate, U-shaped bracket 93 which is attached to oversleeve 40 by welding, for example. Retention members 92 include hooks 94 therein which, as shown in FIG. 11, receive ends 70a and 70b of bolt 60 therethrough to secure oversleeve 40 to drive mechanism 38.

The foregoing connection between oversleeve 40 and bolt 60 which is provided by retention members 92 is especially advantageous when drive mechanism 38 is located at a 12 o'clock position, for example, with respect to opening 24 in wall 22 in order to prevent drive mechanism 38 from disengaging by gravity from expansion ring 36 before drive mechanism 38 is actuated to expand expansion ring 36 in the manner described above. Thus, regardless of the circumferential position of ends 48 of expansion ring 36 and drive mechanism 38 with respect to opening 24 in wall 22, drive mechanism 38 is retained in position before same is actuated to expand expansion ring 36.

Figure 10C:
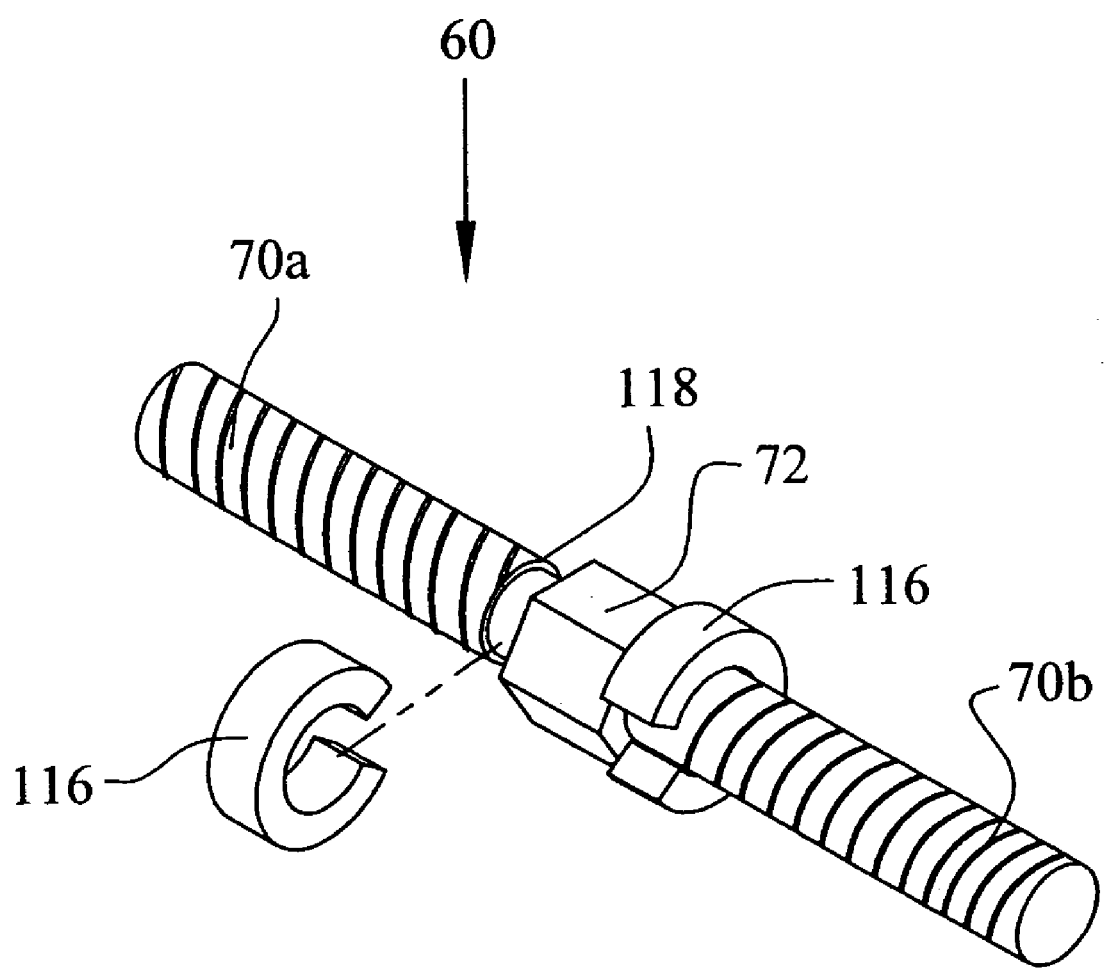
FIG. 10C is a perspective view of a bolt having a pair of C-rings attached thereto at respective sides of the nut portion.
Figure 11:
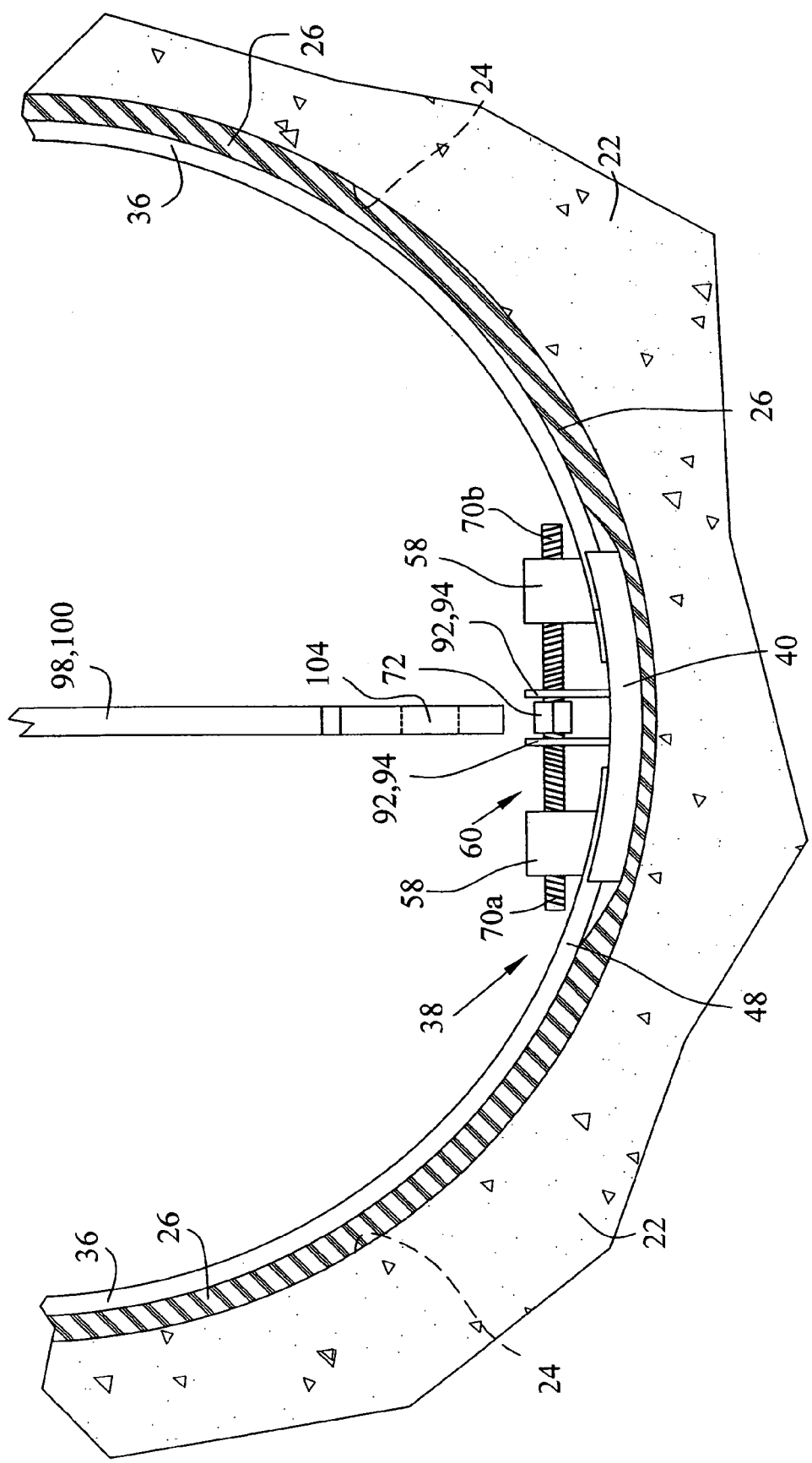
FIG. 11 is a fragmentary elevational view of a gasket within an opening in the wall of a concrete structure, showing a drive mechanism including the oversleeve of FIG. 10A, and further showing the engagement of a tool with the nut portion of the bolt of the drive mechanism.

Referring to FIG. 11, retention members 92 of oversleeve 40 may advantageously be positioned closely adjacent opposite sides of nut portion 72 of bolt 60. Thus, when a tool such as wrench 98 or 100 is engaged with nut portion 72 to rotate bolt 60, the tool is retained on nut portion 72, preventing the tool from laterally disengaging, or slipping off of, nut portion 72. Similarly, as shown in FIG. 10C, bolt 60 may include a pair of C-rings 116 attached thereto on opposite sides of nut portion 72, which extend beyond the outer periphery of nut portion 72 and prevent lateral separation of a tool from nut portion 72. C-rings 116 may be fitted directly to bolt 60 or, as shown in FIG. 10C, may be fitted within grooves 118 of bolt 60 which are disposed on opposite sides of nut portion 72.

Figure 14:
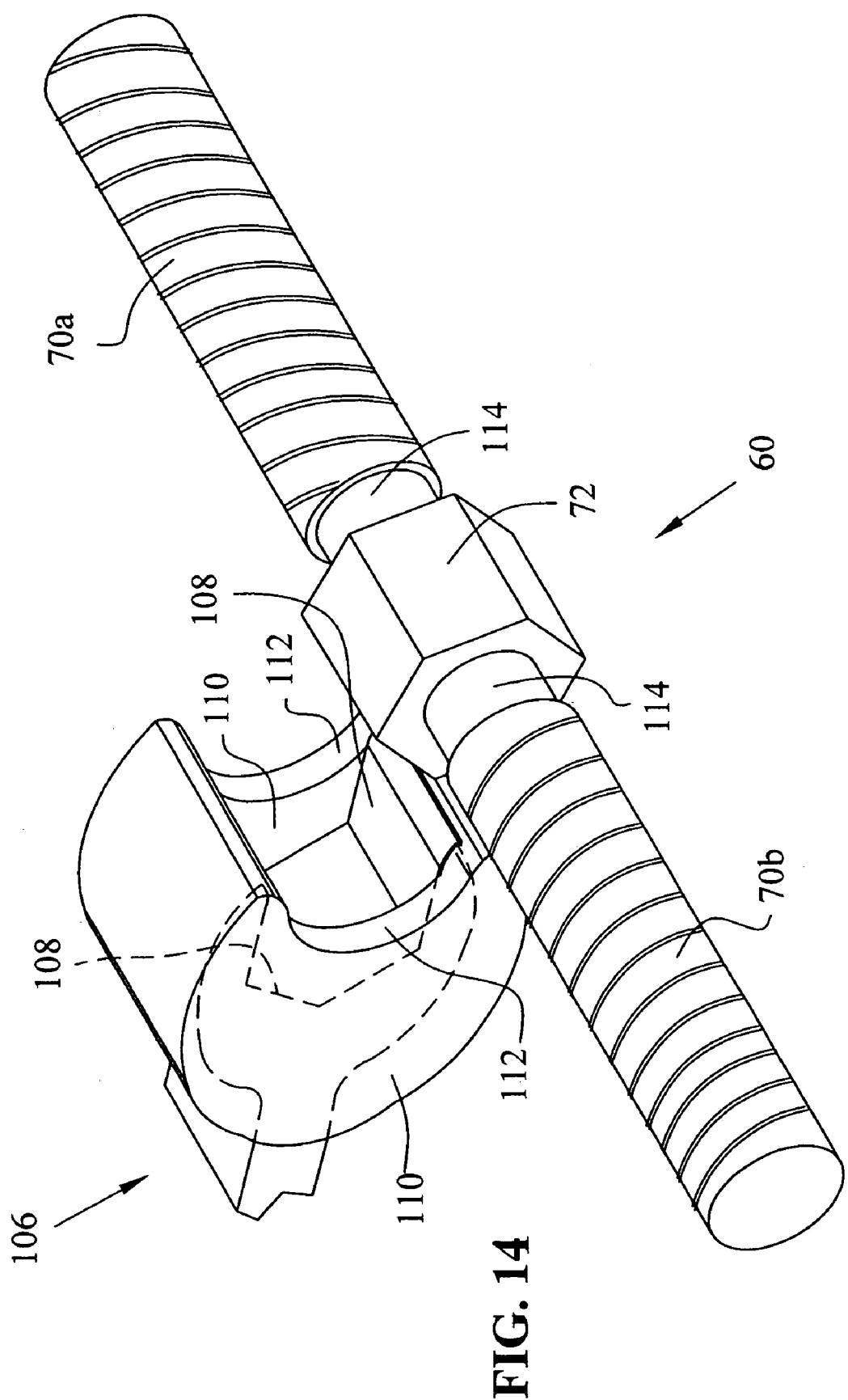
FIG. 14 is a perspective view of a wrench according to the present invention, the wrench including a pair of retention plates for abutting the ends of the nut portion of the bolt of a drive mechanism.

Referring to FIG. 14, wrench 106 is shown, which includes a conventionally-shaped socket end 108 configured to engage nut portion 72 of bolt 60. Wrench 106 may be a standard open-end wrench or alternatively, a torque wrench with a disengagement clutch which may be set to a specified torque rating. Further, socket end 108 may include a transverse notch (not shown) within socket end 108 as is known, to enable ratcheting movement of socket end 108 of wrench 106 about nut portion 72, such that socket end 108 of wrench 106 need not be completely disengaged from nut portion 72 between wrench turns. According to the present invention, socket end 108 additionally includes a pair of retention plates 110 attached to opposite sides thereof. Retention plates 110 include curved edges 112 which project beyond the socket profile of socket end 108 and abut the opposite ends of nut portion 72 to prevent lateral separation of socket portion 108 of wrench 106 from nut portion 72 during and in between wrench turns. During rotation of nut portion 72, curved edges 112 engage annular smooth surfaces 114 of bolt 60 which are disposed on opposite sides of nut portion 72. Wrench 106 is particularly useful for engaging nut portion 72 to rotate bolt 60 when drive mechanism 38 is disposed within a small clearance space, as shown in FIG. 7.

Figure 12:
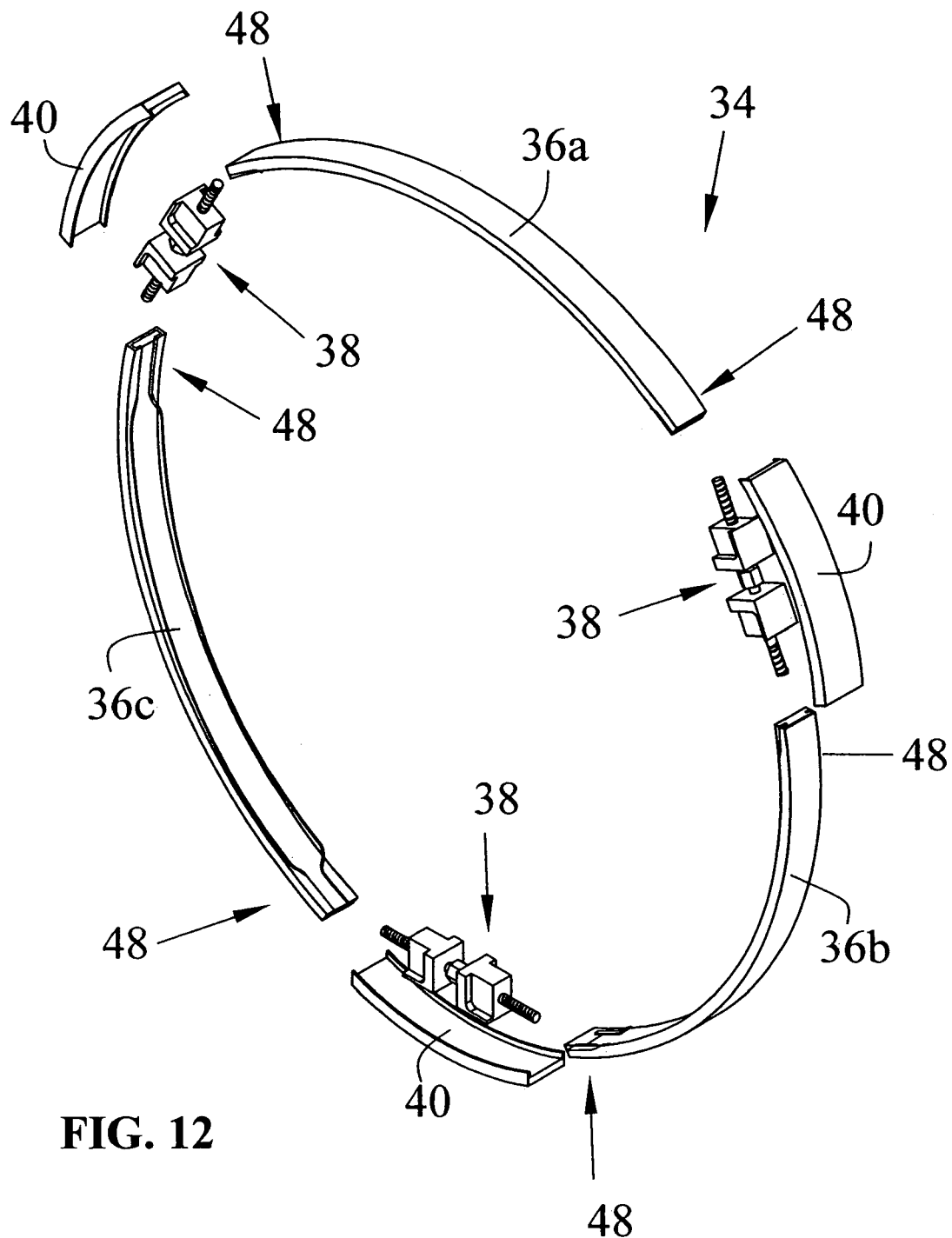
FIG. 12 is a perspective, exploded view of an expansion ring assembly in accordance with yet another alternative embodiment.

Referring to FIG. 12, a further embodiment of expansion ring assembly 34 is shown, wherein expansion ring 36 is formed from a plurality of individual ring segments 36a, 36b, and 36c, each of which may have the same overall cross-sectional profile and configuration as shown in FIGS. 1A–3 and described above. Each ring segment 36a, 36b, and 36c includes opposite ends 48, and a drive mechanism 38 installed between each pair of adjacent ends 48 of ring segments 36a, 36b, and 36c. In addition, oversleeves 40 may overlap and receive adjacent ends 48 of ring segments 36a, 36b, and 36c, as described above, to prevent relative lateral movement between ends 48 as expansion ring 36 is expanded. When the expansion ring assembly of FIG. 12 is installed within a gasket in an opening in the wall of the concrete structure, each drive mechanism 38 may be actuated in the manner described above to radially expand adjacent ring segments 36a, 36b, and 36c. Notably, the expansion ring assembly shown in FIG. 12 is particularly useful with gaskets having large diameters, and additionally, the multiple drive mechanisms provide greater variability to the radial dimensions of expansion ring 36, which aids in compensating for irregularities in gasket 26 or opening 24 in wall 22 of a structure. For example, if gasket 26 needs to be sealingly compressed to a greater extent at a certain location along its circumference, the drive mechanism(s) 38 most closely adjacent that section of gasket 26 may be actuated to expand ring segments 36a, 36b, and 36c to further compress that section of gasket 26 and enhance the seal.

Figure 7:
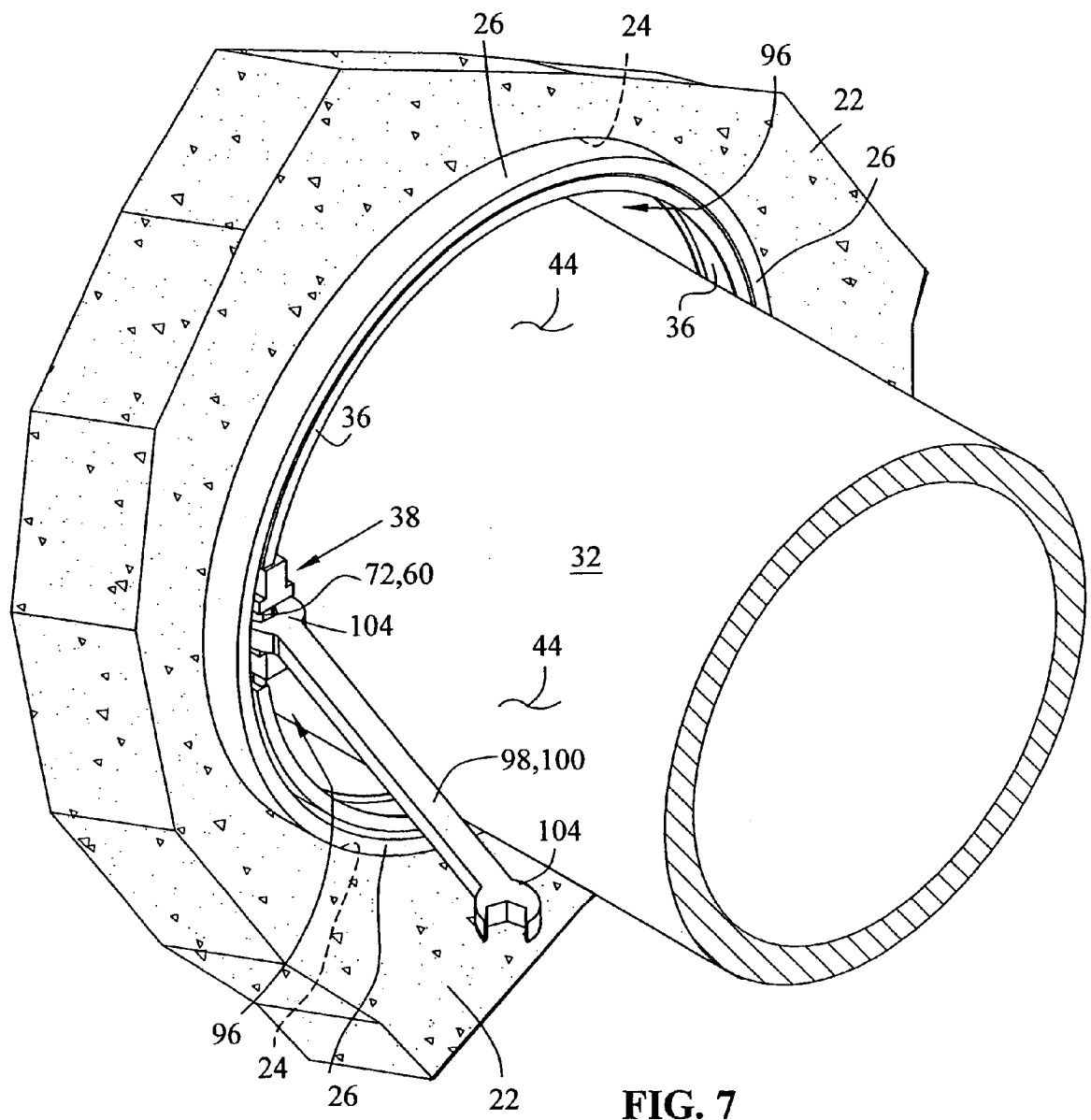
FIG. 7 is a perspective view of a connection between a pipe and an opening in the wall of a concrete structure, showing a tool engaged with the drive mechanism of the expansion ring.

Referring to FIG. 7, pipe 32 is shown connected to opening 24 in wall 22 of a structure with an expansion ring assembly according to the present invention. After pipe 32 is connected to gasket 26 and the structure, it might be necessary in the course of maintenance to tighten drive mechanism 38 to further expand expansion ring 36 to enhance the compressive seal of gasket 26. As shown in FIG.

7, a clearance space 96 exists between expansion ring 36 and outer surface 44 of pipe 32 in which drive mechanism 38 is disposed. Depending upon the diameter of pipe 32 and/or other factors, clearance space 96 may be a very narrow space, such that nut portion 72 of bolt 60 of drive mechanism 38 is not easily accessible by a tool.

In FIGS. 8 and 9, specially designed wrenches 98 and 100 are shown for engaging nut portion 72 of bolt 60 of drive mechanism 38 when same is within a small clearance space 96 between expansion ring 36 and pipe 32. Each wrench 98 and 100 includes shank 102 having a longitudinal axis $A_1$—$A_1$, and a pair of opposing open socket ends 104. Socket ends 104 are shaped such that the angular orientation of same varies with respect to the longitudinal axis $A_1$—$A_1$ of shanks 102 in a progression of 15° increments. Specifically, socket ends 104 include 135° socket end 104a of wrench 98, 150° socket end 104b of wrench 98, 165° socket end 104c of wrench 100, and 180° socket end 104c of wrench 100. The foregoing progression of the varying angular orientation of socket ends 104 may be indicated on wrenches 98 and 100 by raised bumps 106 to provide a user with a tactile indication as to which socket head 104 is being used. The varying angular orientation of socket ends 104 allows a suitable socket end 104 to be engaged with nut portion 72 of bolt 60 of drive mechanism 38 in clearance space 96 regardless of the rotational position of nut portion 72. In this manner, as shown in FIG. 7, a suitable socket end 104 may be engaged with nut portion 72 within a very small clearance space 96, followed by turning wrench 98 or 100 through a small angle to rotate nut portion 72 through ⅛ of a turn, for example, to expand expansion ring 36. Then, different socket ends 104a–d of wrenches 98 and 100 may be sequentially used as needed to continue to rotate nut portion 72 until expansion ring 36 is radially expanded to compress gasket 26 to a desired extent into sealing engagement with opening 24 in wall 22.

Figure 13:
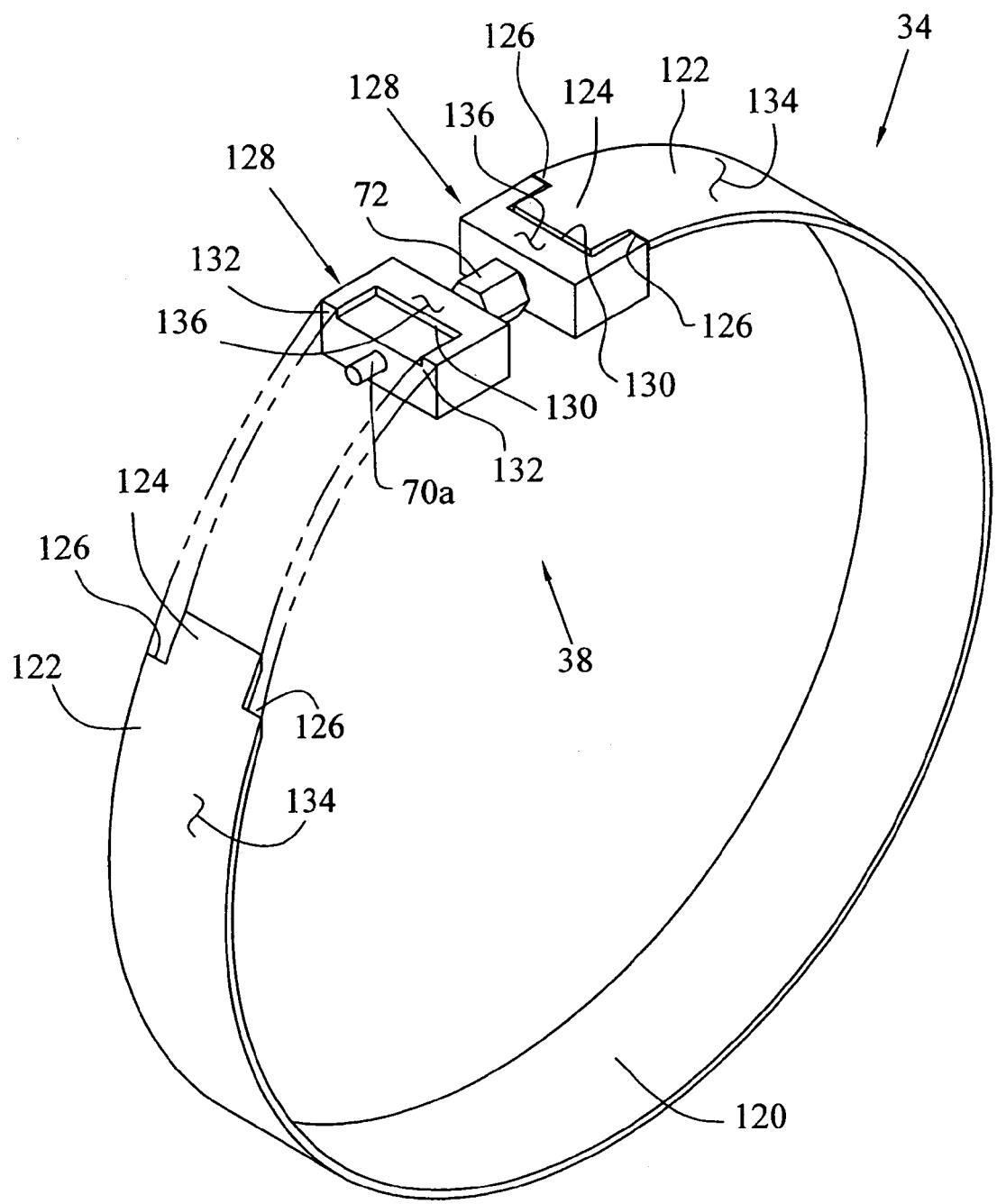
FIG. 13 is a perspective view of an expansion ring assembly in accordance with a further embodiment.

Referring to FIG. 13, an additional embodiment of expansion ring assembly 34 is shown. Expansion ring 120 is formed from a continuous strip of a flat material, such as stainless steel, for example, and includes ends 122 formed with tabs 124 and shoulders 126. Drive mechanism 38 includes bolt 60 having nut portion 72 and block members 128 including recesses 130 and front edges 132. To engage block members 128 with ends 122 of expansion ring 120, tabs 124 of ends 122 are received within recesses 130 of block members 128, with front edges 132 of block members 128 contacting shoulders 126 of ends 122. As may be seen in FIG. 13, in the foregoing arrangement, outer surface 134 of expansion ring 120 at ends 122 thereof is substantially flush with bottom surfaces 136 of block members 128.

The expansion ring assembly of FIG. 13 functions to expand gasket 26 in the same general manner as described above regarding previous embodiments. However, the engagement of tabs 124 of ends 122 of expansion ring 120 within recesses 130 of block members 128 prevents lateral movement between ends 122, such that an oversleeve 40 is not needed with the drive mechanism 38 of FIG. 13. Optionally, an oversleeve 40 may be used with the drive mechanism 38 if desired, wherein outer surface 134 of expansion ring 120 slidingly contacts base wall 74 of oversleeve 40 as block members 128 are driven apart.

Referring to FIGS. 15–17, a further embodiment of the expansion ring assembly is shown. Expansion ring assembly 140 generally includes an expansion ring 142 having a pair of end portions 144, together with a drive mechanism 146. Except as described below, expansion ring 142 and drive mechanism 146 are similar to, and function in the same manner as the above-discussed expansion ring assemblies of FIGS. 1–14. Drive mechanism 146 generally includes a pair of block members 148 and a bolt 150. Bolt 150 includes tool-receiving structure in the form of a hexagonal nut 152, and oppositely threaded ends 154a and 154b. Each block member 148 is formed of a suitable high-strength metal such as stainless steel, for example, and includes threaded bore 156 therethrough, with the bores 156 of the two block members 148 being oppositely threaded.

Bock members 148 additionally include interlocking structure for removable, interlocking engagement with end portions 144 of expansion ring 142, including projection 158 having a pair of concave curved surfaces 160 defining a pair of undercut portions 162 on each side of projection 158. Lip portion 164 projects outwardly along projection 158. Each end portion 144 of expansion ring 142 includes a notch 166 defining a pair of projections 168, each projection 168 including a convex curved surface 170.

Referring to FIG. 15, end portions 144 of expansion ring 142 are received within block members 148 such that projection 158 of each block member 148 is received within a corresponding notch 166 of an end portion 144 of expansion ring 142, with projections 168 of each end portion 144 of expansion ring 142 received within corresponding undercut portions 162 of a block member 148, wherein convex curved surfaces 170 of projections 168 closely engage the concave curved surfaces 160 of undercut portions 162. The foregoing structure provides a wedging engagement between end portions 144 and block members 148. Additionally, as shown in FIG. 16, lip portion 164 of each block member 148 is disposed in an overlapping manner over the outer surface 172 of end portions 144 of expansion ring 142.

The foregoing interlocking engagement between end portions 144 of expansion ring 142 and block members 148 prevents relative lateral movement between end portions 144 of expansion ring 142 with respect to block members 148 in a direction generally transverse to the longitudinal axis of bolt 150. The engagement of lip portion 164 of block members 148 with outer surfaces 172 of end portions 144 of expansion ring 142 also prevents disengagement of end portions 144 from block members in a direction radially outwardly with respect to block members 148. In this manner, the interlocking engagement between block members 148 and end portions 144 of expansion ring 142 confines the movement of end portions 144 to a radially outward direction with respect to one another when bolt 150 is rotated to drive block members 148 away from one another and expand expansion ring 142 in the manner discussed above. Also, the wedging engagement between end portions 144 of expansion ring 142 and block members 148, discussed above, tends to increase the strength of the connections between end portions 144 of expansion ring 142 and block members 148 as progressively greater forces are imposed upon the foregoing structure upon expansion of expansion ring 142.

Referring to FIG. 16, expansion ring assembly 140 may additionally include oversleeve 40, discussed above, which fits over end portions 144 of expansion ring 142 to span the distance therebetween. As shown in FIG. 16, oversleeve also fits over block members 148 of drive mechanism 146. Referring to FIG. 17, a strip of tape 174, which may be any type of adhesive tape, for example, may be applied in an overlapping manner over oversleeve 40 and end portions 144 of expansion ring 142 to temporarily secure end portions 144 of expansion ring 142, block members 148 of drive mechanism 146, and oversleeve 40 to one another before expansion ring assembly 140 is installed, to thereby prevent separation of the foregoing components before installation of expansion ring assembly 140 in the field. This arrangement is especially convenient when expansion ring assembly 140 includes a plurality of expansion ring segments and drive mechanisms 146, such as in the embodiment shown in FIG. 12 and discussed above, in applications in which a large diameter expansion ring 142 is used. Upon rotation of bolt 150 to drive block members 148 and end portions 144 of expansion ring 142 radially away from one another to thereby expand expansion ring assembly 140, tape 174 breaks along one or both of break lines 176, shown in FIG. 17, and the tape segments may remain on expansion ring assembly 140 after installation.

Further, as shown in FIG. 20, end portions 144 of expansion ring 142 may optionally be bent or crimped radially inwardly at 178, such that end portions 144 are aligned with respect to one another substantially along a chord of the circle which is defined by expansion ring 142. The foregoing bending of end portions 144 aids in the attachment and fitting of end portions 144 of expansion ring 142 to block members 148 of drive mechanism 146, particularly in applications where the diameter of expansion ring 142 is large, such as in the embodiment of FIG. 12 discussed above.

Referring to FIGS. 18 and 19, a further embodiment of a drive mechanism which may be used with any of the foregoing expansion ring assemblies is shown. Drive mechanism 180 is identical to drive mechanism 146 disclosed above, except that block members 182 of drive mechanism 180 are formed of rigid plastic material, such as by injection molding, for example. Suitable rigid plastics include Nylon 6/6 (30–40% glass fiber reinforced) and Nylon 4/6 (50% glass fiber reinforced). A pair of threaded inserts 184 are embedded within block members 182, such as by insert molding inserts 184 within block members 182 when block members 182 are formed. Each insert 184 is formed of a high-strength material such as stainless steel, for example, and the inserts 184 of the two block members 182 are oppositely threaded for the reasons discussed above. Additionally, each insert 184 may include one or more anchoring ridges 186 projecting therefrom, which aid in securely anchoring threaded inserts 184 within the plastic material of block members 182 during the insert molding of inserts 184 within block members 182. Advantageously, forming block members 182 of a rigid plastic material reduces the overall cost of drive mechanism 180 of the expansion ring assembly due to the fact that less steel is used.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An expansion ring assembly, comprising:
   a ring including a pair of end portions; and
   a drive mechanism, comprising:
   a pair of plastic block members each having a threaded insert therein, said inserts of said block members being oppositely threaded, said block members connected to respective end portions of said ring; and
   a bolt including oppositely-threaded ends respectively threaded within said inserts of said block members, wherein rotation of said bolt in a first direction causes said block members to be simultaneously driven apart from one another to thereby expand said ring.

2. The expansion ring assembly of claim 1, wherein said drive mechanism is disposed substantially within said ring, and said block members are removably connected to respective end portions of said ring.

3. The expansion ring assembly of claim 1, wherein each insert is insert molded within its respective block member.

4. The expansion ring assembly of claim 3, wherein each insert is made of metal and has a generally cylindrical shape.

5. The expansion ring assembly of claim 4, wherein each insert includes at least one anchoring ridge projecting outwardly therefrom.

6. The expansion ring assembly of claim 1, wherein said ring includes a longitudinal axis, said bolt disposed perpendicular to said longitudinal axis.

7. The expansion ring assembly of claim 1, wherein said end portions of said ring define an opening in said ring therebetween, said opening spanned by said drive mechanism.

8. The expansion ring assembly of claim 1, further comprising an oversleeve engaging and overlapping said end portions of said ring, whereby said oversleeve prevents lateral movement of said end portions with respect to one another.

9. The expansion ring assembly of claim 1, wherein said ring is formed of a plurality of segments, each connection between adjacent segments provided by a said drive mechanism.

10. The expansion ring assembly of claim 1, wherein said end portions of said ring include first interlocking structure and said block members include second interlocking structure, said first interlocking structures of said ring end portions removably engaged with respective said second interlocking structures of said block members.

11. The expansion ring assembly of claim 10, wherein said first interlocking structure of said ring end portions comprises a notch defining a pair of first projections and said second interlocking structure of said block members comprises a second projection disposed between a pair of undercut portions, said second projection received within said notch and said first projections received within said undercut portions.

12. An expansion ring assembly, comprising:
   a ring including a pair of end portions, each end portion including first interlocking structure; and
   a drive mechanism, comprising:
   a pair of block members each having second interlocking structure and a threaded bore therein, said bores of said block members being oppositely threaded, said first interlocking structures of said ring end portions removably engaged with respective said second interlocking structures of said block members;
   a bolt including oppositely-threaded ends respectively threaded within said bores of said block members, wherein rotation of said bolt in a first direction causes said block members to be simultaneously driven apart from one another to thereby expand said ring; and
   said first interlocking structure of said ring end portions comprises a notch defining a pair of first projections and said second interlocking structure of said block members comprises a second projection disposed between a pair of undercut portions, said second projection received within said notch and said first projections received within said undercut portions.

13. An expansion ring assembly, comprising:
a ring including a pair of end portions, each end portion including first interlocking structure; and
a drive mechanism, comprising:
a pair of block members each having second interlocking structure and a threaded bore therein, said bores of said block members being oppositely threaded, said first interlocking structures of said ring end portions removably engaged with respective said second interlocking structures of said block members; and
a bolt including oppositely-threaded ends respectively threaded within said bores of said block members, wherein rotation of said bolt in a first direction causes said block members to be simultaneously driven apart from one another to thereby expand said ring, wherein each said block member is formed of a rigid plastic including a threaded insert therein, said inserts of said block members being oppositely threaded.

14. An expansion ring assembly, comprising:
a ring including a pair of end portions; and
a drive mechanism including a pair of block members each having a threaded bore therethrough, said bores of said block members being oppositely threaded, said block members connected to respective end portions of said ring, and a bolt including oppositely-threaded ends respectively threaded within said bores of said block members;
an oversleeve member disposed externally of said ring and overlapping said end portions of said ring; and
a tape strip adhesively secured over said oversleeve member and at least one of said end portions of said ring;
wherein rotation of said bolt in a first direction causes said block members to be driven away from one another to thereby drive said end portions of said ring away from one another and break said tape strip.

15. The expansion ring assembly of claim 14, wherein said drive mechanism is disposed substantially within said ring, and said block members are removably connected to respective end portions of said ring.

16. The expansion ring assembly of claim 14, wherein each said block member is formed of a rigid plastic including a threaded insert therein, said inserts of said block members being oppositely threaded.

17. The expansion ring assembly of claim 14, wherein adjacent said end portions of said ring segments define a gap therebetween, each said gap spanned by a said drive mechanism.

18. The expansion ring assembly of claim 14, wherein said end portions of said ring include first interlocking structure and said block members include second interlocking structure, said first interlocking structures of said ring end portions removably engaged with respective said second interlocking structures of said block members.

19. The expansion ring assembly of claim 18, wherein said first interlocking structure of said ring end portions comprises a notch defining a pair of first projections and said second interlocking structure of said block members comprises a second projection disposed between a pair of undercut portions, said second projection received within said notch and said first projections received within said undercut portions.

20. An expansion ring assembly, comprising:
a ring including a pair of end portions; and
a drive mechanism, comprising:
a pair of block members each having a threaded bore therein, said bores of said block members being oppositely threaded, said end portions of said ring removably engaged with respective said block members; and
a bolt including oppositely-threaded ends respectively threaded within said bores of said block members, said bolt comprising the sole connection between said block members other than said ring, wherein rotation of said bolt in a first direction causes said block members to be simultaneously driven apart from one another to thereby expand said ring.

21. The expansion ring assembly of claim 20, further comprising an oversleeve having a substantially U-shaped cross section, said oversleeve overlapping said end portions of said ring.

22. The expansion ring assembly of claim 20, wherein said ring includes a planar web portion having an outer surface and pair of side walls depending interiorly therefrom, said web portion and said side walls defining a substantially U-shaped cross section.

23. The expansion ring assembly of claim 20, wherein said bolt includes tool engagement structure disposed in between said block members.

24. An expansion ring assembly, comprising:
a ring including a pair of end portions, each end portion including first interlocking structure; and
a drive mechanism, comprising:
a pair of block members each having second interlocking structure and a threaded bore therein, said bores of said block members being oppositely threaded, said first interlocking structures of said ring end portions removably engaged with respective said second interlocking structures of said block members; and
a bolt including oppositely-threaded ends respectively threaded within said bores of said block members, wherein rotation of said bolt in a first direction causes said block members to be simultaneously driven apart from one another to thereby expand said ring, wherein said bolt comprises the sole connection between said block members other than said ring.

25. The expansion ring assembly of claim 24, wherein said drive mechanism is disposed substantially within said ring.

26. The expansion ring assembly of claim 24, further comprising an oversleeve having a substantially U-shaped cross section, said oversleeve overlapping said end portions of said ring.

27. The expansion ring assembly of claim 24, wherein said ring includes a planar web portion having an outer surface and pair of side walls depending interiorly therefrom, said web portion and said side walls defining a substantially U-shaped cross section.

28. The expansion ring assembly of claim 24, wherein said bolt includes tool engagement structure disposed in between said block members.

* * * * *